United States Patent
Burtovyy

(10) Patent No.: US 11,299,573 B2
(45) Date of Patent: Apr. 12, 2022

(54) STABLE MASS POLYMERIZABLE POLYCYCLOOLEFIN COMPOSITIONS AS 3D PRINTING MATERIALS AND A METHOD OF FABRICATION THEREOF

(71) Applicant: PROMERUS, LLC, Akron, OH (US)

(72) Inventor: Oleksandr Burtovyy, Akron, OH (US)

(73) Assignee: PROMERUS LLC, Akron, OH (US)

( * ) Notice: Subject to any disclaimer, the term of this patent is extended or adjusted under 35 U.S.C. 154(b) by 0 days.

(21) Appl. No.: 17/145,491

(22) Filed: Jan. 11, 2021

(65) Prior Publication Data

US 2021/0221931 A1 Jul. 22, 2021

Related U.S. Application Data

(60) Provisional application No. 62/958,832, filed on Jan. 9, 2020.

(51) Int. Cl.

| | | |
|---|---|---|
| *C08F 2/46* | (2006.01) | |
| *C08F 2/50* | (2006.01) | |
| *C08G 61/04* | (2006.01) | |
| *C08F 232/08* | (2006.01) | |
| *C08J 5/18* | (2006.01) | |
| *B29C 64/124* | (2017.01) | |
| *B33Y 70/00* | (2020.01) | |
| *B33Y 10/00* | (2015.01) | |
| *B29K 105/00* | (2006.01) | |

(52) U.S. Cl.
CPC .......... *C08F 232/08* (2013.01); *B29C 64/124* (2017.08); *B33Y 10/00* (2014.12); *B33Y 70/00* (2014.12); *C08J 5/18* (2013.01); *B29K 2105/0002* (2013.01); *B29K 2239/00* (2013.01); *C08J 2345/00* (2013.01)

(58) Field of Classification Search
CPC .. B33Y 70/00; B33Y 10/00; C08J 5/18; C08F 232/08; C08F 132/08; B29K 2239/00; B29K 2105/0002

USPC ............ 522/26, 7, 6, 189, 184, 71, 1; 520/1
See application file for complete search history.

(56) References Cited

U.S. PATENT DOCUMENTS

| | | |
|---|---|---|
| 2017/0306171 A1 | 10/2017 | Vidavsky et al. |
| 2020/0002466 A1 | 1/2020 | Burtovyy et al. |

FOREIGN PATENT DOCUMENTS

| | | | | |
|---|---|---|---|---|
| JP | 2010/260916 A | 11/2010 | | |
| WO | WO-2016063282 A1 | * | 4/2016 | ............ B01J 37/34 |
| WO | WO 2017/134674 A1 | 8/2017 | | |
| WO | WO 2019/032937 A1 | 2/2019 | | |
| WO | WO 2019/147878 A1 | 8/2019 | | |

OTHER PUBLICATIONS

Lio, M. O., et al., "Thermal and florescent properties of optical brighteners and their whitening effect for pelletization of cycloolefin copolymers," Materials Letters, 2006, vol. 60, pp. 2132-2137.
Written Opinion of PCT/US2021/012879, dated May 10, 2021.

* cited by examiner

*Primary Examiner* — Jessica Whiteley
(74) *Attorney, Agent, or Firm* — Balaram Gupta

(57) ABSTRACT

Embodiments in accordance with the present invention encompass compositions encompassing a latent organoruthenium compound, a pyridine compound, a photosensitizer and an ultra violet light blocking compound along with one or more monomers which undergo ring open metathesis polymerization (ROMP) when said composition is exposed to suitable actinic radiation to form a substantially transparent film or a three dimensional object. Surprisingly, the compositions are very stable at ambient conditions to temperatures up to 80° C. for several days and undergo mass polymerization only when subjected to actinic radiation under inert atmosphere such as for example a blanket of nitrogen. Accordingly, compositions of this invention are useful in various opto-electronic applications, including as 3D printing materials, coatings, encapsulants, fillers, leveling agents, among others.

20 Claims, 4 Drawing Sheets

STABLE MASS POLYMERIZABLE POLYCYCLOOLEFIN COMPOSITIONS AS 3D PRINTING MATERIALS AND A METHOD OF FABRICATION THEREOF

CROSS REFERENCE TO RELATED APPLICATIONS

This application claims the benefit of U.S. Provisional Application No. 62/958,832, filed Jan. 9, 2020, which is incorporated herein by reference in its entirety.

BACKGROUND OF THE INVENTION

Field of the Invention

Embodiments in accordance with the present invention relate generally to a single component mass polymerizable polycycloolefin monomer compositions in combination with a latent organo-ruthenium compound, a photosensitizer, a pyridine compound and a compound capable of blocking the ultraviolet light. The compositions of this invention exhibit long storage stability at temperatures ranging from ambient temperature to 80° C. especially when stored in inert and dark atmosphere, and undergo mass polymerization only when subjected to suitable actinic radiation to form transparent optical layers having utility in a variety of optoelectronic applications including as 3D printing materials, encapsulants, coatings, and fillers. More specifically, this invention relates to single component stable compositions encompassing norbornene (NB) based olefinic monomers, which have high optical transparency and exhibit desirable properties for fabricating devices, such as optical sensors, light emitting diodes (LEDs), organic light emitting diodes (OLED), 3D printing materials, among other devices.

Description of the Art

Organic light emitting diodes (OLEDs) are gaining importance in a variety of applications, including flat panel televisions and other flexible displays, among other applications. However, conventional OLEDs, particularly, bottom emitting OLEDs suffer from a drawback in that only about half of the generated photons are emitted into the glass substrate out of which 25% are extracted into air. The other half of the photons are wave-guided and dissipated in the OLED stack. This loss of photons is primarily attributed to the refractive index (n) mismatch between the organic layers (n=1.7-1.9) and the glass substrate (n=1.5). By matching the refractive index of the substrate (n=1.8) and organic layers and augmenting the distance of the emission zone to the cathode to suppress plasmonic losses light extraction into the substrate can be increased to 80-90%. See, for example, G. Gaertner et al., Proc. Of SPIE, Vol. 6999, 69992T pp 1-12 (2008).

In addition, OLEDs also pose other challenges; in that OLEDs being organic materials, they are generally sensitive to moisture, oxygen, temperature, and other harsh conditions. Thus, it is imperative that OLEDs are protected from such harsh atmospheric conditions. See for example, U. S. Patent Application Publication No. US2012/0009393 A1.

In order to address some of the issues faced by the art, U.S. Pat. No. 8,263,235 discloses use of a light emitting layer formed from at least one organic light emitting material and an aliphatic compound not having an aromatic ring, and a refractive index of the light emitting from 1.4 to 1.6. The aliphatic compounds described therein are generally a variety of polyalkyl ethers, and the like, which are known to be unstable at high temperatures, see for example, Rodriguez et al., I & EC Product Research and Development, Vol. 1, No. 3, 206-210 (1962).

U.S. Pat. No. 9,944,818 discloses a two component mass polymerizable composition which is capable of tailoring to the desirable refractive index and is suitable as a filler and a protective coating material, thus potentially useful in the fabrication of a variety of OLED devices. Although this approach may provide certain advantages it still suffers from the drawback of being two component system and in addition organic polymers alone may not be able to provide required high refractive index for the OLED applications. Furthermore, there is also a need for mass polymerizable compositions which are stable at temperatures ranging from room temperatures up to 80° C. for several days such that the compositions can be stored at various operating conditions such as for example, vat 3D printing, where liquid compositions are stored in a 3D printer as well as OLED fabrication conditions, and yet the liquid composition polymerizes instantly when subjected to suitable photolytic conditions and/or higher temperatures. In addition, it has been observed that especially under 3D printing conditions the compositions stored in the vat may prematurely polymerize either due to air and/or exposure to light.

Accordingly, there is still a need for filler materials that complement the refractive index of OLEDs and yet exhibit high transparency and good thermal properties, among other desirable properties. In addition, it is desirable that such organic filler materials readily form a permanent protective coatings and are available as a single component composition for dispensing with such OLED layers or in a vat 3D printing operations.

Thus, it is an object of this invention to provide compositions that overcome the gaps faced by the art. More specifically, it is an object of this invention to provide a single component composition that will mass polymerize under the conditions of the fabrications of 3D printing and/or fabrications of an OLED device. It is further an object of this invention to provide stable single component mass polymerizable composition with no change in viscosity at or below normal storage conditions, including up to a temperature of about 80° C. but which undergoes mass polymerization only under the process conditions in which the 3D object or an OLED device is finally fabricated, such as for example by the use of radiation.

Other objects and further scope of the applicability of the present invention will become apparent from the detailed description that follows.

SUMMARY OF THE INVENTION

Surprisingly, it has now been found that by employing a single component composition, it is now possible to fabricate a 3D object or an OLED device having a transparent optical layer which features hitherto unachievable properties, i.e., refractive index in the range of 1.4 to 1.8 or higher, high colorless optical transparency, desirable film thickness of the filler layer typically in the range of 10 to 20 μm but can be tailored to lower or higher film thickness depending upon the intended application, compatible with the OLED stack, particularly the cathode layer (a very thin layer on the top of the OLED stack), compatible with polymerization of the formulation on the OLED stack, including fast polymerization time and can be photolytically treated, adhesion to both OLED stack and glass cover, and the like. It is also important to note that the compositions of this invention are expected to exhibit good uniform leveling across the OLED layer which typically requires a low viscosity. Further, compositions of this invention are also expected to exhibit low shrinkage due to their rigid polycycloolefinic structure. In addition, as the components of this invention undergo fast mass polymerization upon application they do not leave behind any fugitive small molecules which can damage the OLED stack. Generally, no other small molecule additives need to be employed thus offering additional advantages. Most importantly, the compositions of this invention are stable (i. e., no change in viscosity) at ambient atmospheric conditions including up to 80° C. for several hours to several days, especially when kept under inert conditions, and undergo mass polymerization only upon UV exposure. Most importantly, the compositions of this invention exhibit excellent shelf life stability in that the compositions of this invention retain their initial viscosity for several days, at least five to ten days.

Advantageously, the compositions of this invention are also compatible with a "one drop fill" (commonly known as "ODF"). In a typical ODF process, which is commonly used to fabricate a top emission OLED device, a special optical fluid is applied to enhance the transmission of light from the device to the top cover glass, and the fluid is dispensed by an ODF method. Although the method is known as ODF which can be misleading because several drops or lines of material are generally dispensed inside the seal lines. After applying the fluid, the fluid spreads out as the top glass is laminated, analogous to die-attach epoxy. This process is generally carried out under vacuum to prevent air entrapment. The present invention allows for a material of low viscosity which readily and uniformly coats the substrate with rapid flow in a short period of time. Even more advantageously, the present invention overcomes the deficiencies faced by the prior art in that a single component composition is much more convenient than employing a two component system especially in an ODF method. Furthermore the composition of the invention when used in accordance with the process conditions as provided herein provides more transparent 3D objects having good mechanical and thermal properties.

BRIEF DESCRIPTION OF THE DRAWINGS

Embodiments in accordance with the present invention are described below with reference to the following accompanying figures and/or images. Where drawings are provided, it will be drawings which are simplified portions of various embodiments of this invention and are provided for illustrative purposes only.

DETAILED DESCRIPTION

Figure 1:
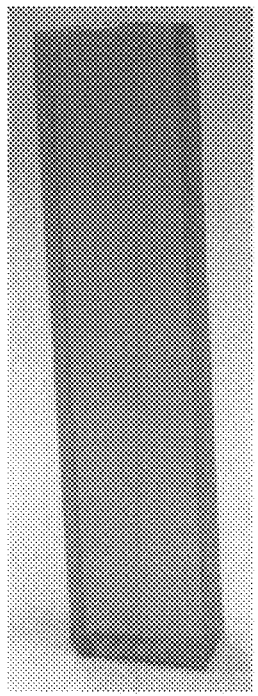
FIG. 1 shows a three dimensional vertical bar printed using a Flashforge Hunter DLP 3D printer using a composition embodiment and a process embodiment of this invention.

The terms as used herein have the following meanings:

As used herein, the articles "a," "an," and "the" include plural referents unless otherwise expressly and unequivocally limited to one referent.

Since all numbers, values and/or expressions referring to quantities of ingredients, reaction conditions, etc., used herein and in the claims appended hereto, are subject to the various uncertainties of measurement encountered in obtaining such values, unless otherwise indicated, all are to be understood as modified in all instances by the term "about."

Where a numerical range is disclosed herein such range is continuous, inclusive of both the minimum and maximum values of the range as well as every value between such minimum and maximum values. Still further, where a range refers to integers, every integer between the minimum and maximum values of such range is included. In addition, where multiple ranges are provided to describe a feature or characteristic, such ranges can be combined. That is to say that, unless otherwise indicated, all ranges disclosed herein are to be understood to encompass any and all sub-ranges subsumed therein. For example, a stated range of from "1 to 10" should be considered to include any and all sub-ranges between the minimum value of 1 and the maximum value of 10. Exemplary sub-ranges of the range 1 to 10 include, but are not limited to, 1 to 6.1, 3.5 to 7.8, and 5.5 to 10, etc.

As used herein, "hydrocarbyl" refers to a group that contains carbon and hydrogen atoms, non-limiting examples being alkyl, cycloalkyl, aryl, aralkyl, alkaryl, and alkenyl. The term "halohydrocarbyl" refers to a hydrocarbyl group where at least one hydrogen has been replaced by a halogen. The term perhalocarbyl refers to a hydrocarbyl group where all hydrogens have been replaced by a halogen.

As used herein, the expression "alkyl" means a saturated, straight-chain or branched-chain hydrocarbon substituent having the specified number of carbon atoms. Particular alkyl groups are methyl, ethyl, n-propyl, isopropyl, n-butyl, iso-butyl, tert-butyl, and so on. Derived expressions such as "alkoxy", "thioalkyl", "alkoxyalkyl", "hydroxyalkyl", "alkylcarbonyl", "alkoxycarbonylalkyl", "alkoxycarbonyl", "diphenylalkyl", "phenylalkyl", "phenylcarboxyalkyl" and "phenoxyalkyl" are to be construed accordingly.

As used herein, the expression "cycloalkyl" includes all of the known cyclic groups. Representative examples of "cycloalkyl" includes without any limitation cyclopropyl, cyclobutyl, cyclopentyl, cyclohexyl, cycloheptyl, cyclooctyl, and the like. Derived expressions such as "cycloalkoxy", "cycloalkylalkyl", "cycloalkylaryl", "cycloalkylcarbonyl" are to be construed accordingly.

As used herein, the expression "perhaloalkyl" represents the alkyl, as defined above, wherein all of the hydrogen atoms in said alkyl group are replaced with halogen atoms selected from fluorine, chlorine, bromine or iodine. Illustrative examples include trifluoromethyl, trichloromethyl, tribromomethyl, triiodomethyl, pentafluoroethyl, pentachloroethyl, pentabromoethyl, pentaiodoethyl, and straight-chained or branched heptafluoropropyl, heptachloropropyl, heptabromopropyl, nonafluorobutyl, nonachlorobutyl, undecafluoropentyl, undecachloropentyl, tridecafluorohexyl, tridecachorohexyl, and the like. Derived expression, "perhaloalkoxy", is to be construed accordingly. It should further be noted that certain of the alkyl groups as described herein, such as for example, "alkyl" may partially be fluorinated, that is, only portions of the hydrogen atoms in said alkyl group are replaced with fluorine atoms and shall be construed accordingly.

As used herein the expression "acyl" shall have the same meaning as "alkanoyl", which can also be represented structurally as "R—CO—," where R is an "alkyl" as defined herein having the specified number of carbon atoms. Additionally, "alkylcarbonyl" shall mean same as "acyl" as defined herein. Specifically, "($C_1$-$C_4$)acyl" shall mean formyl, acetyl or ethanoyl, propanoyl, n-butanoyl, etc. Derived expressions such as "acyloxy" and "acyloxyalkyl" are to be construed accordingly.

As used herein, the expression "aryl" means substituted or unsubstituted phenyl or naphthyl. Specific examples of substituted phenyl or naphthyl include o-, p-, m-tolyl, 1,2-, 1,3-, 1,4-xylyl, 1-methylnaphthyl, 2-methylnaphthyl, etc. "Substituted phenyl" or "substituted naphthyl" also include any of the possible substituents as further defined herein or one known in the art.

As used herein, the expression "arylalkyl" means that the aryl as defined herein is further attached to alkyl as defined herein. Representative examples include benzyl, phenylethyl, 2-phenylpropyl, 1-naphthylmethyl, 2-naphthylmethyl and the like.

As used herein, the expression "alkenyl" means a non-cyclic, straight or branched hydrocarbon chain having the specified number of carbon atoms and containing at least one carbon-carbon double bond, and includes ethenyl and straight-chained or branched propenyl, butenyl, pentenyl, hexenyl, and the like. Derived expression, "arylalkenyl" and five membered or six membered "heteroarylalkenyl" is to be construed accordingly. Illustrative examples of such derived expressions include furan-2-ethenyl, phenylethenyl, 4-methoxyphenylethenyl, and the like.

As used herein, the expression "heteroaryl" includes all of the known heteroatom containing aromatic radicals. Representative 5-membered heteroaryl radicals include furanyl, thienyl or thiophenyl, pyrrolyl, isopyrroyl, pyrazolyl, imidazolyl, oxazolyl, thiazolyl, isothiazolyl, and the like. Representative 6-membered heteroaryl radicals include pyridinyl, pyridazinyl, pyrimidinyl, pyrazinyl, triazinyl, and the like radicals. Representative examples of bicyclic heteroaryl radicals include, benzofuranyl, benzothiophenyl, indolyl, quinolinyl, isoquinolinyl, cinnolyl, benzimidazolyl, indazolyl, pyridofuranyl, pyridothienyl, and the like radicals.

"Halogen" or "halo" means chloro, fluoro, bromo, and iodo.

In a broad sense, the term "substituted" is contemplated to include all permissible substituents of organic compounds. In a few of the specific embodiments as disclosed herein, the term "substituted" means substituted with one or more substituents independently selected from the group consisting of ($C_1$-$C_6$)alkyl, ($C_2$-$C_6$)alkenyl, ($C_1$-$C_6$)perfluoroalkyl, phenyl, hydroxy, —$CO_2H$, an ester, an amide, ($C_1$-$C_6$) alkoxy, ($C_1$-$C_6$)thioalkyl and ($C_1$-$C_6$)perfluoroalkoxy. However, any of the other suitable substituents known to one skilled in the art can also be used in these embodiments.

It should be noted that any atom with unsatisfied valences in the text, schemes, examples and tables herein is assumed to have the appropriate number of hydrogen atom(s) to satisfy such valences.

By the term "latent organo-transition metal catalyst" is meant organo-transition metal compounds that show little or no catalytic activity at a particular (usually ambient atmospheric conditions) temperature and initiate such activity either upon heat or light or both. Generally the catalytic activity of the catalyst can be kept latent for a prolonged periods of time, which can range from five days or longer especially when it is stored at room temperature or lower in a dark atmosphere. Higher temperatures and/or light may accelerate the catalytic activity.

By the term "derived" is meant that the polymeric repeating units are polymerized (formed) from, for example, polycyclic norbornene-type monomers in accordance with formulae (I) or (IV) wherein the resulting polymers are ring opened metathesis polymerized (ROMP), for example, the 2,3 double bond of norbornene-type monomers are ring opened and polymerized as shown below:

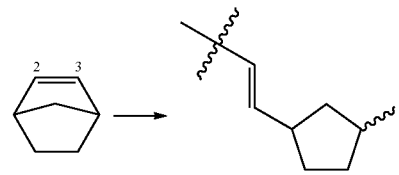

Accordingly, in accordance with the practice of this invention there is provided a single component composition encompassing a) one or more monomers of formula (I):

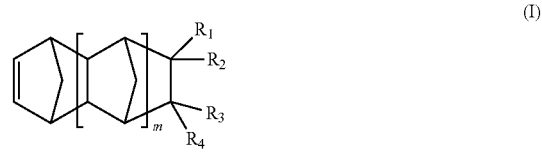

wherein:

m is an integer 0, 1 or 2;

$R_1$, $R_2$, $R_3$ and $R_4$ are the same or different and each independently selected from the group consisting of hydrogen, halogen, methyl, ethyl, linear or branched ($C_3$-$C_{16}$) alkyl, perfluoro($C_1$-$C_{12}$)alkyl, hydroxy($C_1$-$C_{16}$)alkyl, ($C_3$-$C_{12}$)cycloalkyl, ($C_6$-$C_{12}$)bicycloalkyl, ($C_7$-$C_{14}$) tricycloalkyl, ($C_6$-$C_{10}$)aryl, ($C_6$-$C_{10}$)aryl($C_1$-$C_6$)alkyl, perfluoro($C_6$-$C_{10}$)aryl, perfluoro($C_6$-$C_{10}$)aryl($C_1$-$C_6$)alkyl, tri($C_1$-$C_6$)alkoxysilyl and a group of formula (A):

—Z-Aryl           (A)

wherein:

Z is a bond or a group selected from the group consisting of:

$(CR_5R_6)_a$, $O(CR_5R_6)_a$, $(CR_5R_6)_aO$, $(CR_5R_6)_a$—O—$(CR_5R_6)_b$, $(CR_5R_6)_a$—O—$(SiR_5R_6)_b$, $(CR_5R_6)_a$—(CO)O—$(CR_5R_6)_b$, $(CR_5R_6)_a$—O(CO)—$(CR_5R_6)_b$, $(CR_5R_6)_a$—(CO)—$(CR_5R_6)_b$, where a and b are integers which may be the same or different and each independently is 1 to 12;

$R_5$ and $R_6$ are the same or different and each independently selected from the group consisting of hydrogen, methyl, ethyl, linear or branched ($C_3$-$C_6$)alkyl, hydroxy, methoxy, ethoxy, linear or branched ($C_3$-$C_6$)alkyloxy, acetoxy, ($C_2$-$C_6$)acyl, hydroxymethyl, hydroxyethyl, linear or branched hydroxy($C_3$-$C_6$)alkyl, phenyl and phenoxy;

Aryl is phenyl or phenyl substituted with one or more of groups selected from the group consisting of methyl, ethyl, linear or branched ($C_3$-$C_6$)alkyl, hydroxy, methoxy, ethoxy, linear or branched $(C_3\text{-}C_6)$alkyloxy, acetoxy, $(C_2\text{-}C_6)$acyl, hydroxymethyl, hydroxyethyl, linear or branched hydroxy $(C_3\text{-}C_6)$alkyl, phenyl and phenoxy;

b) an organo-ruthenium compound selected from the group consisting of a compound of formula (II) and a compound of formula (III):

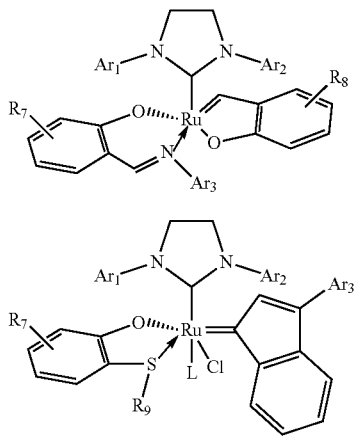

wherein

L is $P(R)_3$, wherein each R is independently selected from the group consisting of methyl, ethyl, linear or branched $(C_3\text{-}C_6)$alkyl, $(C_3\text{-}C_8)$cycloalkyl and $(C_6\text{-}C_{10})$aryl;

$R_7$ and $R_8$ are the same or different and each independently selected from the group consisting of methyl, ethyl, linear or branched $(C_3\text{-}C_6)$alkyl, methoxy, ethoxy and linear or branched $(C_3\text{-}C_6)$alkyloxy;

$R_9$ is selected from the group consisting of methyl, ethyl, linear or branched $(C_3\text{-}C_6)$alkyl, $(C_6\text{-}C_{10})$aryl and $(C_6\text{-}C_{10})$aryl$(C_1\text{-}C_6)$alkyl;

$Ar_1$, $Ar_2$ and $Ar_3$ are the same or different and independently selected from the group consisting of substituted or unsubstituted phenyl, substituted or unsubstituted biphenyl and substituted or unsubstituted naphthyl, wherein each of said substituents are independently selected from the group consisting of methyl, ethyl and linear or branched $(C_3\text{-}C_6)$alkyl;

c) a compound of formula (IV) or a compound of formula (V):

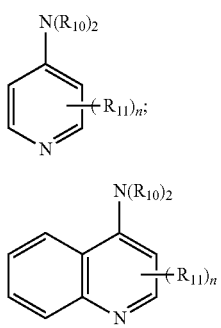

wherein n is an integer from 0 to 4;

each $R_{10}$ is independently selected from the group consisting of hydrogen, methyl, ethyl, n-propyl, iso-propyl, n-butyl, iso-butyl and tert-butyl;

$R_{11}$ is selected from the group consisting of methyl, ethyl, linear or branched $(C_3\text{-}C_6)$alkyl, $(C_6\text{-}C_{10})$aryl, methoxy, ethoxy, linear or branched $(C_3\text{-}C_6)$alkoxy, $(C_6\text{-}C_{10})$aryloxy and halogen;

d) a photoactive compound of formula (VI):

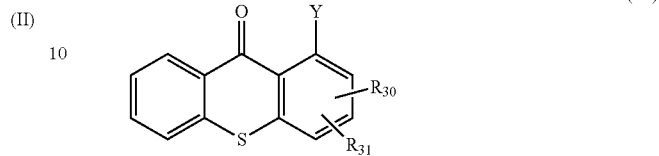

wherein

Y is halogen; and $R_{30}$ and $R_{31}$ are the same or different and independently of each other selected from the group consisting of hydrogen, methyl, ethyl, linear or branched $(C_3\text{-}C_{12})$alkyl, $(C_3\text{-}C_{12})$cycloalkyl, $(C_6\text{-}C_{12})$bicycloalkyl, $(C_7\text{-}C_{14})$tricycloalkyl, $(C_6\text{-}C_{10})$aryl, $(C_6\text{-}C_{10})$aryl$(C_1\text{-}C_3)$alkyl, $(C_1\text{-}C_{12})$alkoxy, $(C_3\text{-}C_{12})$cycloalkoxy, $(C_6\text{-}C_{12})$bicycloalkoxy, $(C_7\text{-}C_{14})$tricycloalkoxy, $(C_6\text{-}C_{10})$aryloxy$(C_1\text{-}C_3)$alkyl and $(C_6\text{-}C_{10})$aryloxy; and e) a compound of formula (VII):

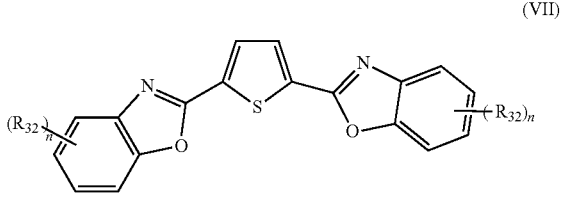

wherein n is an integer from 0 to 4;

each $R_{32}$ is independently selected from the group consisting of hydrogen, methyl, ethyl, linear or branched $(C_3\text{-}C_{12})$alkyl, $(C_3\text{-}C_{12})$cycloalkyl, $(C_6\text{-}C_{12})$bicycloalkyl, $(C_7\text{-}C_{14})$tricycloalkyl, $(C_6\text{-}C_{10})$aryl, $(C_6\text{-}C_{10})$aryl$(C_1\text{-}C_3)$alkyl, $(C_1\text{-}C_{12})$alkoxy, $(C_3\text{-}C_{12})$cycloalkoxy, $(C_6\text{-}C_{12})$bicycloalkoxy, $(C_7\text{-}C_{14})$tricycloalkoxy, $(C_6\text{-}C_{10})$aryloxy$(C_1\text{-}C_3)$alkyl and $(C_6\text{-}C_{10})$aryloxy;

said composition is in a clear liquid form at room temperature.

As used herein the Aryl may further include the following:

substituted or unsubstituted biphenyl of formula:

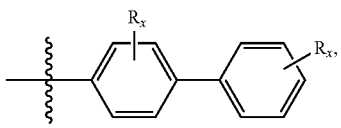

substituted or unsubstituted naphthyl of formula:

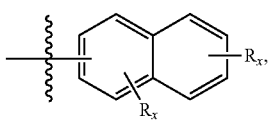

substituted or unsubstituted terphenyl of formula:

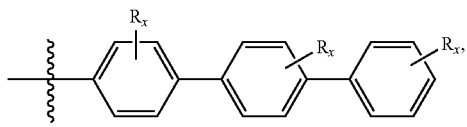

substituted or unsubstituted anthracenyl of formula:

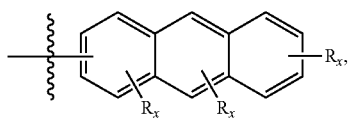

substituted or unsubstituted fluorenyl of formula:

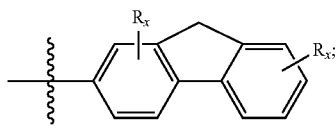

where $R_x$ in each occurrence is independently selected from methyl, ethyl, linear or branched $(C_3-C_{12})$alkyl or $(C_6-C_{10})$aryl.

As noted, the monomer of formula (I) is having a refractive index of at least 1.5. The composition is in a clear liquid form at room temperature. Surprisingly, as noted above, the compositions of this invention are stable at temperatures ranging from room temperature to 80° C., thus offering excellent shelf life stability. As used herein, "stable" means the composition of this invention remains clear without increase of any viscosity when kept at temperatures ranging from room temperature to 80° C., especially when kept in a dark atmosphere, such as for example, in amber colored containers in the absence of any light. Accordingly, in some embodiments, the composition of this invention exhibits no viscosity change when stored at temperatures below 80° C. for a period of more than four (4) days. Accordingly, in some embodiments, the composition of this invention exhibits less than five (5) percent viscosity increase when stored at temperatures below 80° C. for a period of more than four (4) days. In some other embodiments, the composition of this invention exhibits less than ten (10) percent viscosity change when stored at temperatures below 80° C. for a period of four (4) days to ten (10) days.

The monomers employed in the composition of this invention are themselves known in the literature or can be prepared by any of the known methods in the art to make such or similar types of monomers.

In addition, the monomers as described herein readily undergo mass polymerization, i.e., in their neat form without use of any solvents when polymerized under mass ring open metathesis polymerization (ROMP) conditions using certain transition metal catalysts, such as for example, organo-ruthenium and organo-osmium compounds. See for example, R. H. Grubbs et al., *Handbook of Metathesis*, Ed.: Wiley-VCH, Weinheim, Germany, 2003, R. H. Grubbs et al., *Acc. Chem. Res.* 2001, 34, 18-29, R. H. Grubbs et al., *Angew. Chem. Int. Ed.*, 2006, 45, 3760-3765. Also, see U.S. Pat. No. 6,838,489, pertinent portions of which are incorporated herein by reference. The term "mass polymerization" as used herein shall have the generally accepted meaning in the art. That is, a polymerization reaction that is generally carried out substantially in the absence of a solvent. In some cases, however, a small proportion of solvent is present in the reaction medium. For example, such small amounts of solvent may be used to dissolve the latent catalyst and/or the activator or convey the same to the reaction medium. Also, some solvent may be used to reduce the viscosity of the monomer. The amount of solvent that can be used in the reaction medium may be in the range of 0 to 5 weight percent based on the total weight of the monomers employed. Any of the suitable solvents that dissolves the catalyst, activator and/or monomers can be employed in this invention. Examples of such solvents include alkanes, cycloalkane, toluene, THF, dichloromethane, dichloroethane, and the like.

Advantageously, it has now been found that one or more of the monomers themselves can be used to dissolve the latent catalyst as well as the activator and thus avoiding the need for the use of solvents. In addition, one monomer can itself serve as a solvent for the other monomer and thus eliminating the need for an additional solvent. For example, if first monomer of formula (I) is a solid at room temperature, then the second monomer of formula (I), which is liquid at room temperature can be used as a solvent for the first monomer of formula (I) which is a solid or vice versa. Therefore, in such situations more than one monomer can be employed in the composition of this invention.

Accordingly, it has now been surprisingly found that monomers of formula (I) serve as high refractive index materials imparting high refractive index to the resulting polymeric film upon mass polymerization at a temperature and/or condition different from the application of the composition onto a desirable substrate. In general, the monomers of formula (I) which are suitable in this invention feature a refractive index of at least 1.5. In some embodiments the refractive index of the monomers of formula (I) is higher than 1.5. In some other embodiments the refractive index of the monomers of formula (I) is in the range from about 1.5 to 1.6. In yet some other embodiments the refractive index of the monomers of formula (I) is higher than 1.55, higher than 1.6 or higher than 1.65. In some other embodiments it may even be higher than 1.7.

In general, the composition of this invention exhibits low viscosity, which can be below 100 centipoise or lower. In some embodiments, the viscosity of the composition of this invention is less than 80 centipoise. In some other embodiments the viscosity of the composition of this invention is in the range from about 10 to 100 centipoise. In yet some other embodiments the viscosity of the composition of this invention is lower than 70 cP, lower than 60 cP, lower than 40 cP, lower than 20 cP. In some other embodiments it may even be lower than 10 cP and may vary from as low as 4 cP to 9 cP.

When the composition of this invention contains two or more monomers, for example, they can be present in any desirable amounts that would bring about intended benefit, including either refractive index modification or viscosity modification or both. Accordingly, the molar ratio of first monomer of formula (I) to second monomer of formula (II) can be from 1:99 to 99:1. In some embodiments, the molar ratio of first monomer of formula (I):second monomer of formula (I) is in the range from 5:95 to 95:5; in some other embodiments it is from 10:90 to 90:10; it is from 20:80 to 80:20; it is from 30:70 to 70:30; it is from 60:40 to 40:60; and it is 50:50, and so on. Similarly, when more than two different monomers of formula (I) are employed, any ratios of such monomers can be used that would bring about the intended result.

In general, the compositions in accordance with the present invention encompass the above described one or more of the monomer of formula (I) and if needed additional monomers of formula (I) distinct from each other, as it will be seen below, various composition embodiments are selected to provide properties to such embodiments that are appropriate and desirable for the use for which such embodiments are directed, thus such embodiments are tailorable to a variety of specific applications.

For example, as already discussed above, proper combination of distinctive monomers of formula (I) makes it possible to tailor a composition having the desirable refractive index, viscosity and optical transmission properties. In addition, as described further herein it may be desirable to include other polymeric or monomeric materials, such as for example inorganic nanoparticles which are compatible to provide desirable optical properties depending upon the end use application. Accordingly, the compositions of this invention can also include other high refractive polymeric materials and/or nanoparticles which will bring about such intended benefit. Examples of such polymers include without any limitation, poly($\alpha$-methylstyrene), poly(vinyl-toluene), copolymers of $\alpha$-methylstyrene and vinyl-toluene, and the like. Examples of nanoparticles are described further in detail below.

Advantageously, it has further been found that the compositions of this invention can also contain additional monomers. In some embodiments, the composition according to this invention may further contain one or more monomers selected from monomer of formula (VIII).

The monomer of formula (VIII) is:

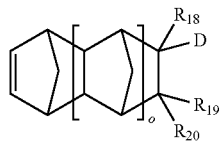

(VIII)

wherein:
o is an integer from 0 to 2, inclusive;
D is $SiR_{21}R_{22}R_{23}$ or a group selected from:

—(CH$_2$)$_c$—O—SiR$_{21}$R$_{22}$R$_{23}$  (E);

—(CH$_2$)$_c$—SiR$_{21}$R$_{22}$R$_{23}$  (F); and

—(SiR$_{21}$R$_{22}$)$_c$—O—SiR$_{21}$R$_{22}$R$_{23}$  (G); wherein c is an integer from 1 to 10, inclusive, and where one or more of CH$_2$ is optionally substituted with $(C_1-C_{10})$alkyl, $(C_1-C_{10})$perfluoroalkyl or $(C_6-C_{14})$aryl;

$R_{18}$, $R_{19}$ and $R_{20}$ are the same or different and independently of each other selected from hydrogen, halogen and hydrocarbyl, where hydrocarbyl is selected from methyl, ethyl, linear or branched $(C_3-C_{12})$alkyl, $(C_3-C_{12})$cycloalkyl, $(C_6-C_{12})$bicycloalkyl, $(C_7-C_{14})$tricycloalkyl, $(C_6-C_{10})$aryl, $(C_6-C_{10})$aryl$(C_1-C_3)$alkyl, $(C_1-C_{12})$alkoxy, $(C_3-C_{12})$cycloalkoxy, $(C_6-C_{12})$bicycloalkoxy, $(C_7-C_{14})$tricycloalkoxy, $(C_6-C_{10})$aryloxy$(C_1-C_3)$alkyl or $(C_6-C_{10})$aryloxy; and $R_{21}$, $R_{22}$ and $R_{23}$ are each independently of one another methyl, ethyl, linear or branched $(C_3-C_9)$alkyl, substituted or unsubstituted $(C_6-C_{14})$aryl, methoxy, ethoxy, linear or branched $(C_3-C_9)$alkoxy or substituted or unsubstituted $(C_6-C_{14})$aryloxy.

In this aspect of the invention, it has now been found that monomers of formula (VIII) provides further advantages. Namely, the monomers of formula (VIII) depending upon the nature of the monomer may impart high or low refractive index to the composition, thus it can be tailored to meet the need. In addition, the monomers of formula (VIII) generally improve the adhesion properties and thus can be used as "adhesion modifiers." Finally, the monomers of formula (VIII) may exhibit low viscosity and good solubility for the latent catalyst and/or activator, among various other advantages.

In some embodiments, the composition of this invention contains first and second monomer of formula (I) distinct from each other and one of said first and second monomers having a refractive index of at least 1.5 and viscosity below 100 centipoise, and wherein said first monomer is completely miscible with said second monomer to form a clear solution. However, as noted, any one or more of monomers of formula (VIII) can also be used in this embodiment of the invention.

In some embodiments the composition of this invention may also contain one or more monomers of formula (IX):

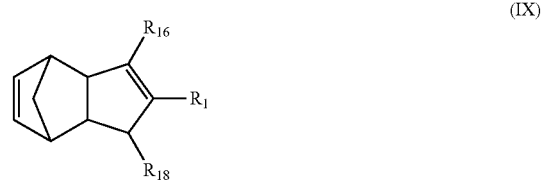

(IX)

wherein
$R_{16}$ and $R_{17}$ are the same or different and each independently selected from the group consisting of hydrogen, methyl, ethyl, linear or branched $(C_3-C_6)$alkyl, methoxy, ethoxy, linear or branched $(C_3-C_6)$alkyloxy, acetoxy, $(C_2-C_6)$acyl, phenyl and phenoxy; or $R_{16}$ taken together with $R_{17}$ and the carbon atoms to which they are attached to form a $(C_5-C_7)$carbocyclic ring optionally containing one or more double bonds;

$R_{18}$ is hydrogen, halogen, methyl, ethyl, linear or branched $(C_3-C_{16})$alkyl, $(C_6-C_{10})$aryl, $(C_6-C_{10})$aryl$(C_1-C_6)$alkyl, hydroxy, methoxy, ethoxy, linear or branched $(C_3-C_{16})$alkoxy, $(C_6-C_{10})$aryloxy, $(C_6-C_{10})$aryl$(C_1-C_6)$alkoxy, —O(CO)R$_{19}$ and —O(CO)OR$_{19}$, where R$_{19}$ is methyl, ethyl, linear or branched $(C_3-C_6)$alkyl, $(C_6-C_{10})$aryl and $(C_6-C_{10})$aryl$(C_1-C_6)$alkyl.

Accordingly, any of the monomers within the scope of monomer of formula (I) or formula (VIII) can be employed in the composition of the invention. Representative examples of monomer of formula (I) or formula (VIII) include the following without any limitations:

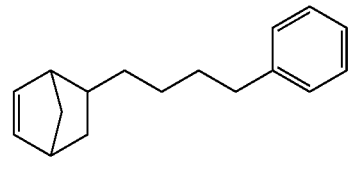

5-(4-phenylbutyl)bicyclo[2.2.1]hept-2-ene;

-continued

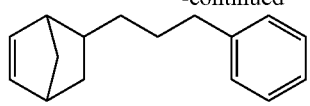

5-(3-phenylpropyl)bicyclo[2.2.1]hept-2-ene;

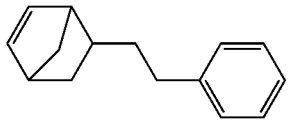

5-phenethylbicyclo[2.2.1]hept-2-ene (PENB);

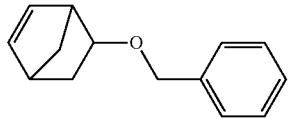

5-(benzyloxy)bicyclo[2.2.1]hept-2-ene;

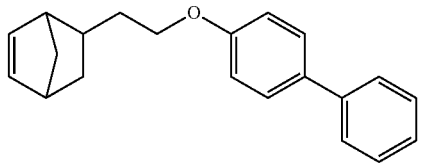

5-(2-([1,1'-biphenyl]-4-yloxy)ethyl)bicyclo[2.2.1]hept-2-ene;

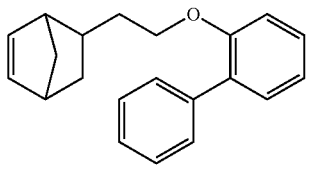

5-(2-([1,1'-biphenyl]-2-yloxy)ethyl)bicyclo
[2.2.1]hept-2-ene (NBEtO-2-PhPh);

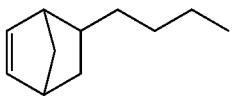

5-butylbicyclo[2.2.1]hept-2-ene (BuNB);

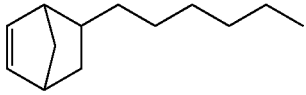

5-hexylbicyclo[2.2.1]hept-2-ene (HexylNB);

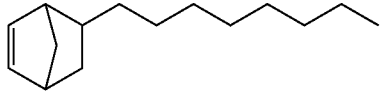

5-octylbicyclo[2.2.1]hept-2-ene (OctNB);

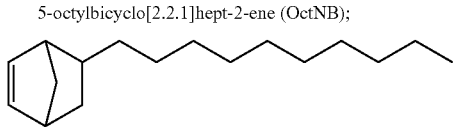

5-decylbicyclo[2.2.1]hept-2-ene (DecNB);

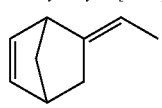

5-ethylidenebicyclo[2.2.1]hept-2-ene;

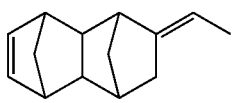

2-ethylidene-1,2,3,4,4a,5,8,8a-octahydro-
1,4:5,8-dimethanonaphthalene;

-continued

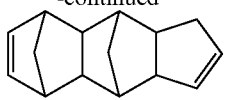

3a,4,4a,5,8,8a,9,9a-octahydro-1H-4,9:5,8-dimethanocyclopenta[b]
naphthalene (one of trimers of cyclopentadiene, TCPD1, also
known as CPD3);

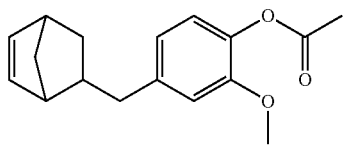

5-norbornenylmethyleugenyl acetate (EuAcNB);

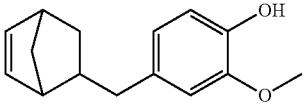

5-norbornenylmethyleugenol (EuOHNB);

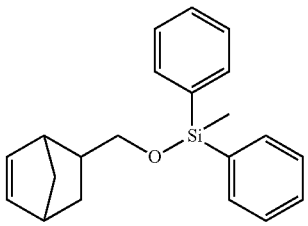

(bicyclo[2.2.1]hept-5-en-2-ylmethoxy)(methyl)diphenylsilane
(NBCH₂OSiMePh₂);

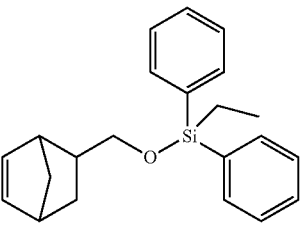

(bicyclo[2.2.1]hept-5-en-2-ylmethoxy)(ethyl)diphenylsilane;

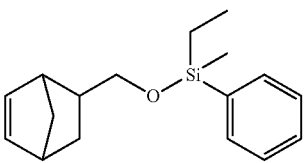

(bicyclo[2.2.1]hept-5-en-2-
ylmethoxy)(ethyl)(methyl)(phenyl)silane;

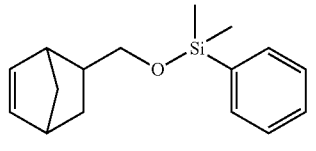

(bicyclo[2.2.1]hept-5-en-2-
ylmethoxy)dimethyl(phenyl)silane;

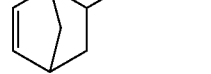 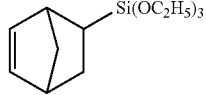

bicyclo[2.2.1]hept-5-en-2-
yltrimethoxysilane (TMSNB);    bicyclo[2.2.1]hept-5-en-2-
yltriethoxysilane (NBSi(OC₂H₅)₃);

-continued

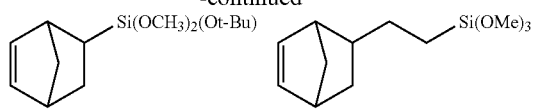

bicyclo[2.2.1]hept-5-en-2-yl (tert-butoxy)dimethoxysilane;

(2-(bicyclo[2.2.1]hept-5-en-2-yl)ethyl)trimethoxysilane;

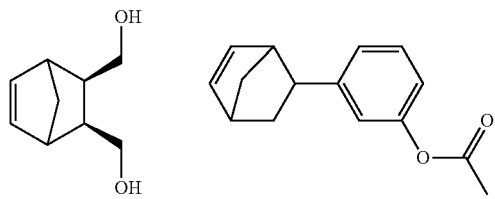

NB(MeOH)₂;

PhAcNB;

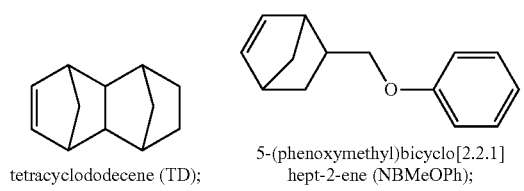

tetracyclododecene (TD);

5-(phenoxymethyl)bicyclo[2.2.1]hept-2-ene (NBMeOPh);

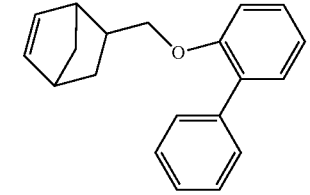

5-(([1,1'-biphenyl]-2-yloxy)methyl)bicyclo[2.2.1]hept-2-ene (NBMeOPhPh);

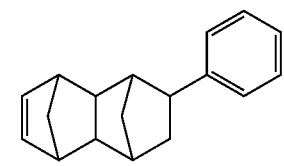

2-phenyl-tetracyclododecene (PhTD);

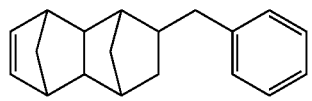

2-benzyl-1,2,3,4,4a,5,8,8a-octahydro-1,4:5,8-dimethanonaphthalene;

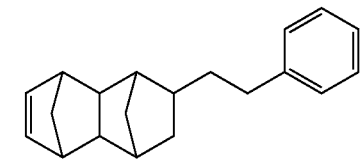

2-phenethyl-1,2,3,4,4a,5,8,8a-octahydro-1,4:5,8-dimethanonaphthalene (PETD);

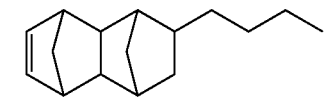

2-butyl-1,2,3,4,4a,5,8,8a-octahydro-1,4:5,8-dimethanonaphthalene (ButylTD);

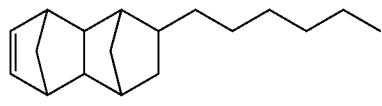

2-hexyl-1,2,3,4,4a,5,8,8a-octahydro-1,4:5,8-dimethanonaphthalene (HexylTD);

-continued

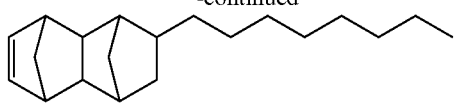

2-octyl-1,2,3,4,4a,5,8,8a-octahydro-1,4:5,8-dimethanonaphthalene (OctylTD);

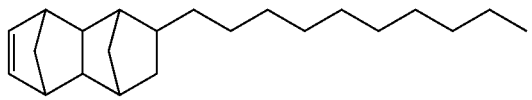

2-decyl-1,2,3,4,4a,5,8,8a-octahydro-1,4:5,8-dimethanonaphthalene (DecylTD);

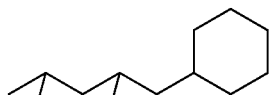

2-cyclohexyl-tetracyclododecene (CyclohexylTD);

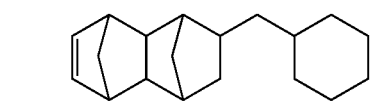

2-cyclohexylmethyl-1,2,3,4,4a,5,8,8a-octahydro-1,4:5,8-dimethanonaphthalene;

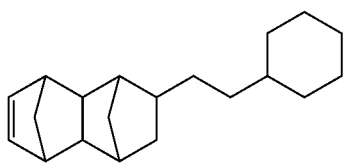

2-cyclohexylethyl-1,2,3,4,4a,5,8,8a-octahydro-1,4:5,8-dimethanonaphthalene;

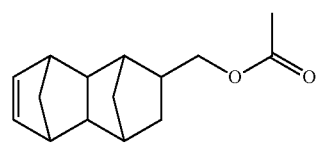

(1,2,3,4,4a,5,8,8a-octahydro-1,4:5,8-dimethanonaphthalene-2-yl)methyl acetate (TDMeOAc); and

tetracyclododecadiene (TDD).

Representative examples of monomer of formula (IX) include the following without any limitations:

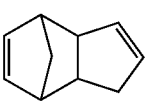

dicyclopentadiene (DCPD);

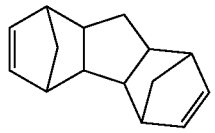

4,4a,4b,5,8,8a,9,9a-octahydro-1H-1,4:5,8-dimethanofluorene (one of trimers of cyclopentadiene, TCPD2);

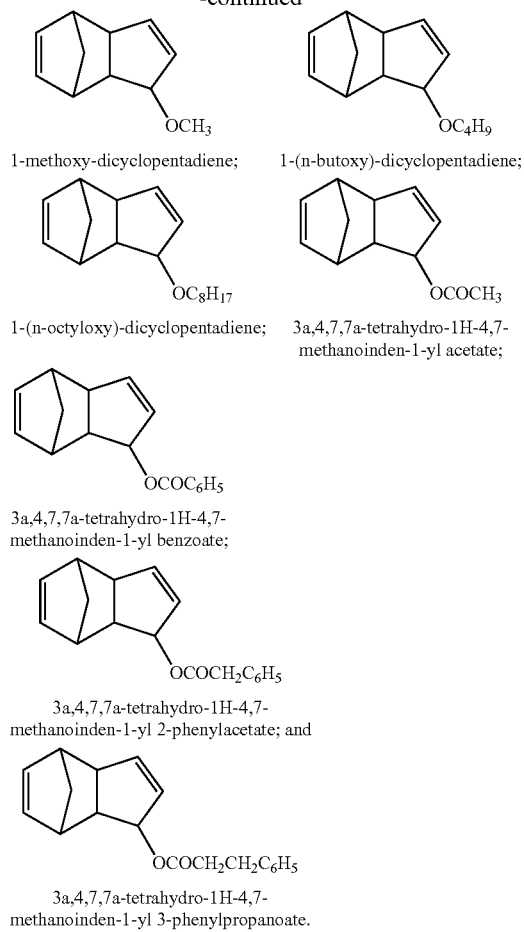

1-methoxy-dicyclopentadiene;

1-(n-butoxy)-dicyclopentadiene;

1-(n-octyloxy)-dicyclopentadiene;

3a,4,7,7a-tetrahydro-1H-4,7-methanoinden-1-yl acetate;

3a,4,7,7a-tetrahydro-1H-4,7-methanoinden-1-yl benzoate;

3a,4,7,7a-tetrahydro-1H-4,7-methanoinden-1-yl 2-phenylacetate; and 3a,4,7,7a-tetrahydro-1H-4,7-methanoinden-1-yl 3-phenylpropanoate.

Surprisingly, it has been further found that utilization of additional additives which are capable of scavenging any of halide radicals formed during photo exposure provides additional benefits in forming clear objects from the compositions of this invention. In addition, such additives may also act as chain terminators to prevent dark reaction. The dark reaction as used herein is meant by polymer chain growth in the unexposed areas. Any of additives which may be helpful in scavenging such halide radicals and chain termination can be employed in this invention. It has now been particularly found that use of certain acrylates provide advantageous benefits as noted herein among other benefits. Exemplary acrylates that may be suitable include without any limitation alkyl acrylates, aryl acrylates, alkyl methacrylates, aryl methacrylates, and the like. Non-limiting examples of such specific acrylates include methyl acrylate, ethyl acrylate, n-propyl acrylate, isopropyl acrylate, n-butyl acrylate, iso-butyl acrylate, tert-butyl acrylate, phenyl acrylate, methyl methacrylate, ethyl methacrylate, n-propyl methacrylate, isopropyl methacrylate, n-butyl methacrylate, iso-butyl methacrylate, tert-butyl methacrylate, phenyl methacrylate, and the like.

Any of the amount of acrylate monomer that will bring about the intended benefit can be used in the composition of this invention. Generally, such amounts depend upon various other additives used in the composition of this invention as is readily appreciated by one of skill in the art. In some embodiments one or more of acrylate monomers are employed in sufficient quantities, which can range from about 1 molar part to 50 molar parts when compared with 5,000 to 10,000 molar parts of monomers of formula (I) or in combination with monomers of formulae (VIII) and/or (IX). In some embodiments, the amount of acrylate monomer used is about 5 to 20 molar parts when compared with 10,000 molar parts of combined monomers of formulae (I), (VIII) and (IX), if employed.

As noted, the composition of this invention contains at least one of organo-ruthenium compound of formulae (II) or (III) that would bring about the mass polymerization as described herein under ROMP conditions when the composition is subjected suitable actinic radiation. Generally, such organo-ruthenium compounds of formulae (II) or (III) are "latent" and become active only under certain conditions. Again, as used herein the term "latent" means that the organo-ruthenium catalysts used in the composition of this invention remain inactive for a prolonged period of time when the composition of this invention is stored at ambient conditions to temperatures up to 80° C. Accordingly, in some embodiments the organo-ruthenium catalysts remain latent for a period of more than four (4) days when stored at temperatures below 80° C. In some other embodiments, the organo-ruthenium catalysts remain latent for a period of four (4) days to ten (10) days when stored at temperatures below 50° C.

Generally, any of the latent organo-ruthenium compounds of formulae (II) or (III) that would bring about ring open metathesis polymerization of the monomers of formulae (I) or (VIII) or (IX) can be employed in the composition of this invention. More specifically, organo-ruthenium compounds that show little or no activity at ambient temperatures can be employed. That is, the latent catalysts that are stable at or near room temperature are more suitable in the composition of this invention. As noted, the latent catalysts may be activated by a variety of conditions, including without any limitation thermal, acid, light and chemical activation. The chemical activation may include use of thermal acid generator or photo acid generators.

Several of the latent catalysts that are suitable to be employed in the compositions of this invention are known in the literature or can be readily made by any of the known procedures in the art. See for example, Grubbs, et al., Organometallics, 2011, 30 (24): 6713-6717; Sutar et al., Angew. Chem. Int. Ed. 2016, 55, 764-767; Leitgeh, et al., Monatsh Chem (2014) 145:1513-1517; van Hensbergen, et al., J. Mater. Chem. C. 2015, 3, 693-702; Grubbs, et al., J. Am. Chem. Soc., 2009, 131, 203802039; Zak, et al., Eur. J. Inorg. Chem., 2014, 1131-1136; Gawin, et al., ACS Catal. 2017, 7, 5443-5449. Further examples of such catalysts can also be found in U.S. Pat. No. 9,328,132, pertinent portions of which are incorporated herein by reference.

Accordingly, in some embodiments, the composition of this invention contains an organo-ruthenium compound of formulae (II) or (III), wherein:

L is selected from the group consisting of $P(iPr)_3$, $P(tert-Bu)_3$, $PCy_3$ and $PPh_3$;

$R_7$ and $R_8$ are the same or different and each independently selected from the group consisting of hydrogen, methyl, ethyl and isopropyl;

$R_9$ is selected from the group consisting of hydrogen, methyl, ethyl and isopropyl;

$Ar_1$, $Ar_2$ and $Ar_3$ are the same or different and each independently selected from the group consisting of phenyl, 2,6-dimethylphenyl, 2,6-diethylphenyl, 2,6-di(isopropyl)phenyl and 2,4,6-trimethylphenyl.

Accordingly, a few of the exemplary latent catalysts, which are within the scope of organo-ruthenium compounds of formula (II) or organo-ruthenium compounds of formula (III), without any limitation maybe selected from the group consisting of:

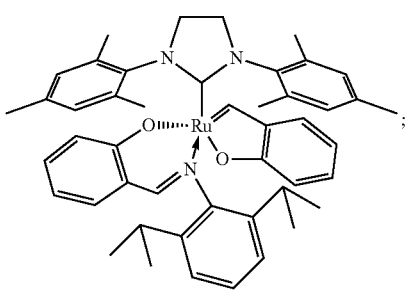

1,3-bis(2,4,6-trimethylphenylimidazolidin-2-
ylidene)-(2-oxobenzylidene)-2-(((2,6-
diisopropylphenyl-
imino)methyl)phenoxy)ruthenium
(Ru-1)

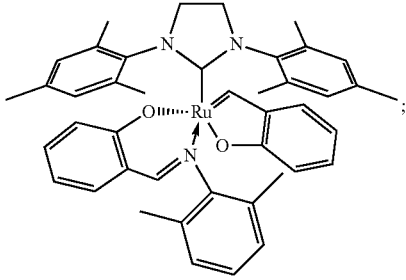

1,3-bis(2,4,6-trimethylphenylimidazolidin-2-
ylidene)-(2-oxobenzylidene)-2-(((2,6-
dimethylphenyl-
imino)methyl)phenoxy)ruthenium
(Ru-2)

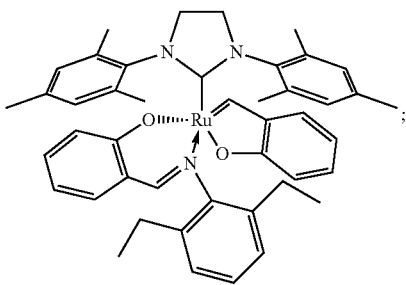

1,3-bis(2,4,6-trimethylphenylimidazolidin-2-
ylidene)-(2-oxobenzylidene)-2-(((2,6-
diethylphenyl-
imino)methyl)phenoxy)ruthenium
(Ru-3)

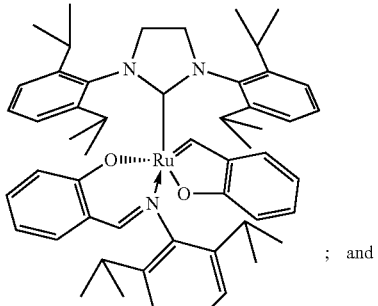

1,3-bis(2,6-
diisotrimethylphenylimidazolidin-2-
ylidene)-(2-oxobenzylidene)-2-(((2,6-
diisopropylphenyl-
imino)methyl)phenoxy)ruthenium
(Ru-4)

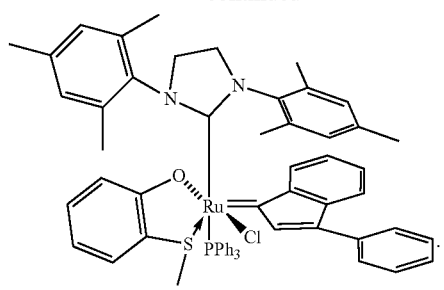

1,3-bis(2,4,6-trimethylphenylimidazolidin-2-
ylidene)-3-phenyl-1H-inden-1-
ylidene)-2-
(methylthio)phenoxy-ruthenium-
triphenylphosphine
chloride
(Ru-5)

As noted, the composition of this invention also contains a compound of formula (IV) or a compound of formula (V). Any of the compounds within the scope of compounds of formula (IV) or (V) can be used in the composition of this invention. In some embodiments the composition of this invention contains a compound of formula (IV) or a compound of formula (V), wherein:

n is an integer from 0 to 2;

each $R_{10}$ is independently selected from the group consisting of methyl, ethyl, iso-propyl and tert-butyl; and $R_{11}$ is selected from the group consisting of methyl, ethyl, iso-propyl, tert-butyl, phenyl, methoxy, ethoxy, phenoxy, fluorine and chlorine.

Non-limiting examples of a compound of formula (IV) or a compound of formula (V) are selected from the group consisting of:

N,N-dimethylpyridin-4-amine (DMAP);

N,N-diethylpyridin-4-amine;

N,N-diisopropylpyridin-4-amine;

N,N-di-tert-butylpyridin-4-amine;

N,N-dimethyl-2-methylpyridin-4-amine;

N,N-di-tert-butyl-2-methylpyridin-4-amine;

2-methoxy-N,N-dimethylpyridin-4-amine;

2-fluoro-N,N-dimethylpyridin-4-amine;

N,N-dimethylquinolin-4-amine;

N,N,2-trimethylquinolin-4-amine;

2-methoxy-N,N-dimethylquinolin-4-amine; and 2-chloro-N,N-dimethylquinolin-4-amine.

As noted, the composition of this invention further contains a compound capable of activating the organo-ruthenium compounds of formulae (II) or (III) when subjected to suitable photolytic conditions. Surprisingly it has now been found that certain of the known photoactive compounds, such as for example, a class of substituted xanthone derivatives can be used for this purpose, which are as illustrated by structural formula (VI).

Representative examples of the compounds of formula (VI), without any limitation, may be listed as follows:

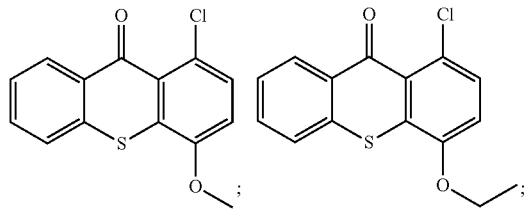

1-chloro-4-methoxy-9H-thioxanthen-9-one 1-chloro-4-ethoxy-9H-thioxanthen-9-one

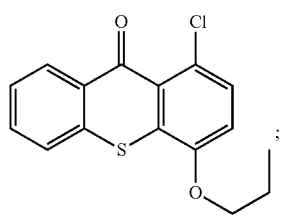

1-chloro-4-propoxy-9H-thioxanthen-9-one (commercially sold under the name CPTX from Lambson)

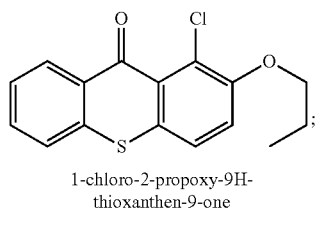

1-chloro-2-propoxy-9H-thioxanthen-9-one

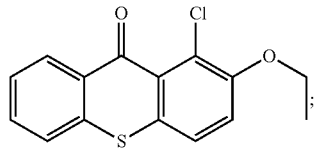

1-chloro-2-ethoxy-9H-thioxanthen-9-one

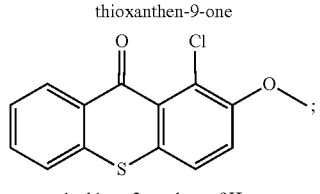

1-chloro-2-methoxy-9H-thioxanthen-9-one

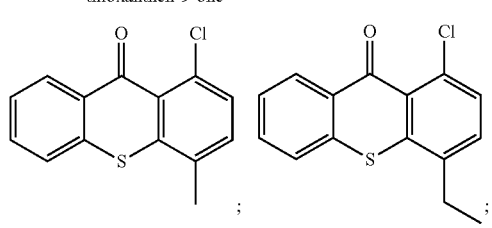

1-chloro-4-methyl-9H-thioxanthen-9-one 1-chloro-4-ethyl-9H-thioxanthen-9-one

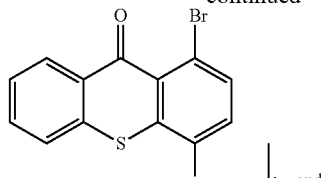

1-bromo-4-propoxy-9H-thioxanthen-9-one

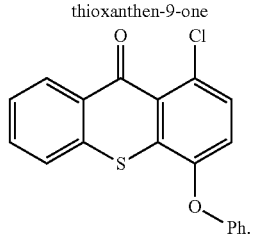

1-chloro-4-phenoxy-9H-thioxanthen-9-one

As noted, the composition of this invention further includes a compound of formula (VII). Advantageously it has now been found that incorporation of a compound of formula (VII) imparts surprisingly further stability to the composition of this invention especially when used in the surroundings of UV exposure, such as for example in a vat of the 3D printer. By inclusion of a compound of formula (VII) surprisingly improves the stability of the composition and the optical performance of the 3D articles made therefrom. It is believed that the compounds of formula (VII) function as UV blockers, among other functions, thereby imparting greater stability to the composition while in peripheral contact with any UV light during the UV exposure of the composition which is drawn out of the vat for forming the intended 3D objects. Therefore, any of the compounds which may function similarly to that of compounds of formula (VII) can also be employed in the composition of this invention, such as for example, any of the other known UV blockers. Any of the amounts of a compound of formula (VII) that would bring about the desired benefit can be employed in the composition of this invention. Generally, such amounts may vary from about 1:200 molar parts of a compound of formula (VII):a compound of formula (II) or (III). In some other embodiments such amounts are from about 1:100 molar parts of a compound of formula (VII):a compound of formula (II) or (I); or 1:50 molar parts of a compound of formula (VII):a compound of formula (I) or (III), and so on.

Representative examples of the compounds of formula (VII), without any limitation, may be listed as follows:

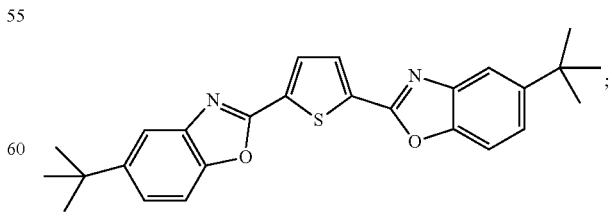

2,5-bis(5-(tert-butyl)benzo[d]oxazol-2-yl)thiophene (BTBBT), available commercially as Benetex OB Plus from Mayzo

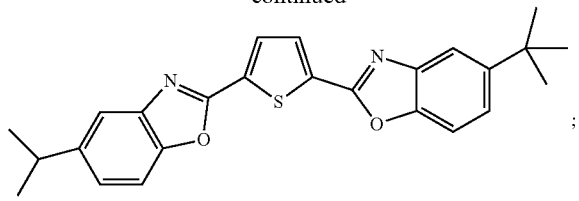

5-(tert-butyl)-2-(5-(5-isopropylbenzo[d]oxazol-2-yl)thiophen-2-yl)benzo[d]oxazole

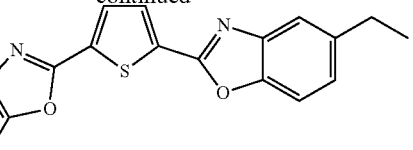

2,5-bis(5-ethylbenzo[d]oxazol-2-yl)thiophene

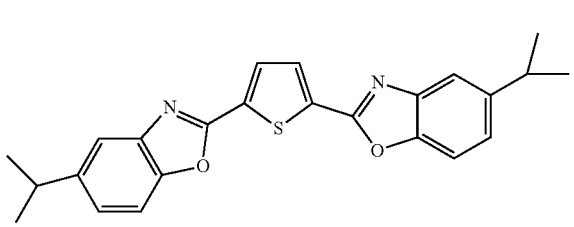

2,5-bis(5-isopropylbenzo[d]oxazol-2-yl)thiophene

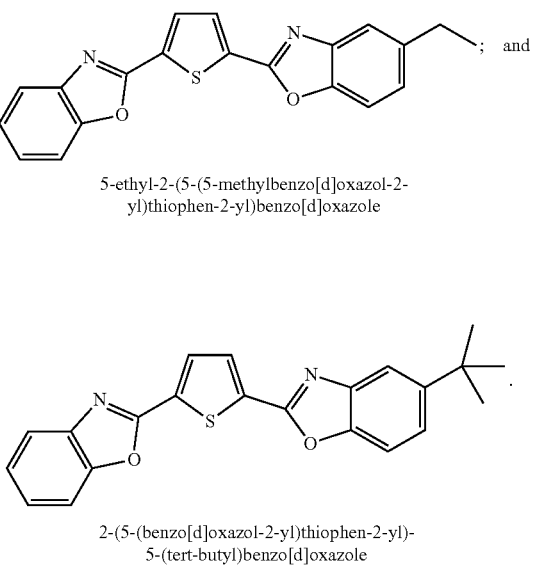

5-ethyl-2-(5-(5-methylbenzo[d]oxazol-2-yl)thiophen-2-yl)benzo[d]oxazole 2-(5-(benzo[d]oxazol-2-yl)thiophen-2-yl)-5-(tert-butyl)benzo[d]oxazole

5-ethyl-2-(5-(5-methylbenzo[d]oxazol-2-yl)thiophen-2-yl)benzo[d]oxazole

Various other UV light blocking compounds and/or UV light absorbers that can be used in the composition of this invention include the following:

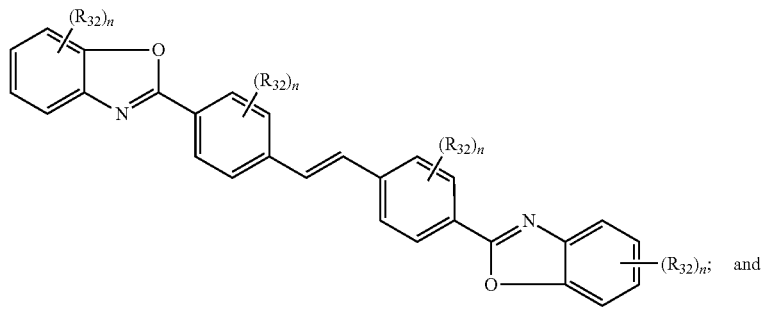

(VIIa)

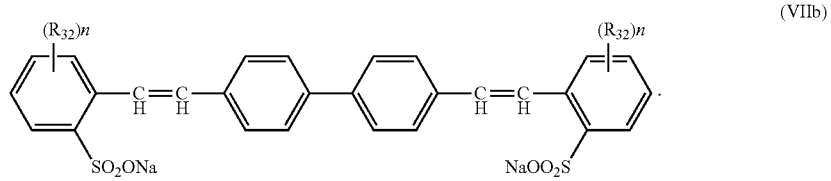

(VIIb)

Wherein n and $R_{32}$ are as defined herein.

Representative compounds within the scope of compounds of formulae (VIIa) and (VIIb) may be represented as follows:

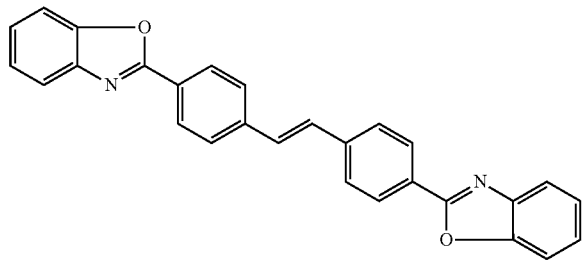 [SMILES: C(=C\c1ccc(-c2nc3ccccc3o2)cc1)/c1ccc(-c2nc3ccccc3o2)cc1]

1,2-bis(4-(benzo[d]oxazol-2-yl)phenyl)ethene, available commercially as Benetex OB-1 from Mayzo; and

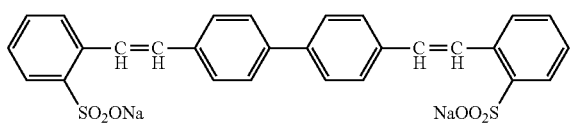

sodium 2,2'-([1,1'-biphenyl]-4,4'-diylbis(ethene-2,1-diyl)) dibenzenesulfonate, available commercially as Benetex OB-M1 from Mayzo.

As noted, surprisingly, it has now been found that employing a suitable combination of a compound of formula (II) or a compound of formula (III) in combination with a compound of formula (IV) or a compound of formula (V) can trigger the mass polymerization of the monomers when the composition is subjected to either a suitable radiation, generally at wavelengths of from about 240 nm to 410 nm, the composition undergoes mass ring open-metathesis polymerization (ROMP) to form a transparent film or an object.

Any amount of organo-ruthenium compound of formulae (II) or (III) can be employed in the composition of this invention which will bring about the intended result. Generally, the molar ratio of monomer:compound of formulae (II) or (III) is in the range of 10,000:1 to 5,000:1 or lower. In some other embodiments such molar ratio of monomer:compound of formula (II) is 15,000:1, 20,000:1 or higher.

Any amount of a compound of formula (IV) or a compound of formula (V) can be employed in the composition of this invention which will bring about the intended result. Generally, the molar ratio of compound of formula (II) or (III):compound of formula (IV) or (V) is in the range of 1:50 or higher. In some other embodiments such molar ratio of compound of formula (II) or formula (III):compound of formula (IV) or (V) is 1:10, 1:15, 1:20, 1:25, 1:30, 1:40, and so on.

In some embodiments the composition of this invention undergoes mass polymerization when exposed to suitable UV irradiation to form a substantially transparent film. The monomers undergo mass polymerization to form films which are substantially transparent to visible light. That is, most of the visible light is transmitted through the film. In some embodiments such film formed from the composition of this invention exhibits a transmission of equal to or higher than 90 percent of the visible light. In some other embodiments such film formed from the composition of this invention exhibits a transmission of equal to or higher than 95 percent of the visible light.

In yet other embodiments the composition of this invention undergoes mass polymerization when exposed to suitable UV irradiation at a temperature from 80° C. to 100° C. to form a substantially transparent film or an object.

In some embodiments the compounds of formula (VI) can be activated at certain wavelength of the electromagnetic radiation which can generally range from about 240 nm to 400 nm. Accordingly, any of the compounds which are active in this electromagnetic radiation can be employed in the compositions of this invention which are stable to the 3D fabrication methods. In some embodiments the wavelength of the radiation to activate the compounds of formula (VI) is 260 nm. In some other embodiments the wavelength of the radiation to activate the compounds of formula (VI) is 310 nm. In yet some other embodiments the wavelength of the radiation to activate the compounds of formula (VI) is 395 nm.

However, any of the other known photoactive compounds which can activate the latent organo-ruthenium compounds of formulae (II) or (III) employed herein can also be used in the composition of this invention. All such compounds are part of this invention.

In some embodiments of this invention the composition of this invention may additionally contain other photosensitizer compounds which can activate the organo-ruthenium compounds of formulae (II) or (III) in order to facilitate the mass polymerization of the monomers of formula (I) and monomers of formulae (VIII) or (IX), if present. For this purpose, any suitable sensitizer compound can be employed in the compositions of the present invention. Such suitable sensitizer compounds include, photosensitizers, such as, anthracenes, phenanthrenes, chrysenes, benzpyrenes, fluoranthenes, rubrenes, pyrenes, xanthones, indanthrenes, and mixtures thereof. In some exemplary embodiments, suitable sensitizer components include mixtures thereof. Generally, the photosensitizers absorb energy from the radiated light source and transfers that energy to the desirable substrate/reactant employed in the composition of this invention.

The compositions in accordance with the present invention may further contain optional additives as may be useful for the purpose of improving properties of both the composition and the resulting object made therefrom. Such optional additives for example may include anti-oxidants and synergists. Any of the anti-oxidants that would bring about the intended benefit can be used in the compositions of this invention. Non-limiting examples of such antioxidants include pentaerythritol tetrakis(3-(3,5-di-tert-butyl-4-hydroxyphenyl)propionate) (IRGANOX™ 1010 from BASF), 3,5-bis(1,1-dimethylethyl)-4-hydroxy-octadecyl ester benzenepropanoic acid (IRGANOX™ 1076 from BASF) and thiodiethylene bis[3-(3,5-di-tert.-butyl-4-hydroxy-phenyl)propionate] (IRGANOX™ 1035 from BASF). Non-limiting examples of such synergists include certain of the secondary antioxidants which may provide additional benefits such as for example prevention of autoxidation and thereby degradation of the composition of this invention and extending the performance of primary antioxidants, among other benefits. Examples of such synergists include, tris(2,4-ditert-butylphenyl)phosphite, commercially available as IRGAFOS 168 from BASF, among others.

In another embodiment of this invention, the composition of this invention encompasses a mixture of 2-hexyl-1,2,3,4,4a,5,8,8a-octahydro-1,4:5,8-dimethanonaphthalene (HexylTD), 1-chloro-4-propoxy-9H-thioxanthen-9-one (CPTX), N,N-dimethylpyridin-4-amine (DMAP), (2,5-bis(5-tert-butyl-benzoxazol-2-yl)thiophene (BTBBT) and 1,3-bis(2,4, 6-trimethylphenylimidazolidin-2-ylidene)-(2-oxobenzylidene)-2-(((2,6-diisopropylphenyl-imino)methyl)phenoxy)ruthenium (Ru-1).

In yet another embodiment of this invention, the composition of this invention encompasses a mixture of 5-phenethylbicyclo[2.2.1]hept-2-ene (PENB), 1-chloro-4-propoxy-9H-thioxanthen-9-one (CPTX), N,N-dimethylpyridin-4-amine (DMAP), (2,5-bis(5-tert-butyl-benzoxazol-2-yl)thiophene (BTBBT) and 1,3-bis(2,4,6-trimethylphenylimidazolidin-2-ylidene)-(2-oxobenzylidene)-2-(((2,6-diisopropylphenyl-imino)methyl)phenoxy)ruthenium (Ru-1).

In yet another embodiment of this invention, the composition of this invention encompasses a mixture of 2-hexyl-1,2,3,4,4a,5,8,8a-octahydro-1,4:5,8-dimethanonaphthalene (HexylTD), 5-phenethylbicyclo[2.2.1]hept-2-ene (PENB), 1-chloro-4-propoxy-9H-thioxanthen-9-one (CPTX), N,N-dimethylpyridin-4-amine (DMAP), (2,5-bis(5-tert-butyl-benzoxazol-2-yl)thiophene (BTBBT) and 1,3-bis(2,4,6-trimethylphenylimidazolidin-2-ylidene)-(2-oxobenzylidene)-2-(((2,6-diisopropylphenyl-imino)methyl)phenoxy)ruthenium (Ru-1).

In yet another embodiment of this invention, the composition of this invention encompasses a mixture of 2-hexyl-1,2,3,4,4a,5,8,8a-octahydro-1,4:5,8-dimethanonaphthalene (HexylTD), 1-chloro-4-propoxy-9H-thioxanthen-9-one (CPTX), N,N-dimethylpyridin-4-amine (DMAP), (2,5-bis(5-tert-butyl-benzoxazol-2-yl)thiophene (BTBBT) and 1,3-bis(2,4,6-trimethylphenylimidazolidin-2-ylidene)-(2-oxobenzylidene)-2-(((2,6-dimethylphenyl-imino)methyl)phenoxy)ruthenium (Ru-2).

In yet another embodiment of this invention, the composition of this invention encompasses a mixture of 2-hexyl-1,2,3,4,4a,5,8,8a-octahydro-1,4:5,8-dimethanonaphthalene (HexylTD), 1-chloro-4-propoxy-9H-thioxanthen-9-one (CPTX), N,N-dimethylpyridin-4-amine (DMAP), (2,5-bis(5-tert-butyl-benzoxazol-2-yl)thiophene (BTBBT) and 1,3-bis(2,4,6-trimethylphenylimidazolidin-2-ylidene)-(2-oxobenzylidene)-2-(((2,6-diethylphenyl-imino)methyl)phenoxy)ruthenium (Ru-3).

In yet another embodiment of this invention, the composition of this invention encompasses a mixture of 2-hexyl-1,2,3,4,4a,5,8,8a-octahydro-1,4:5,8-dimethanonaphthalene (HexylTD), 1-chloro-4-propoxy-9H-thioxanthen-9-one (CPTX), N,N-dimethylpyridin-4-amine (DMAP), (2,5-bis(5-tert-butyl-benzoxazol-2-yl)thiophene (BTBBT) and 1,3-bis(2,6-diisopropylphenylimidazolidin-2-ylidene)-(2-oxobenzylidene)-2-(((2,6-diisopropylphenyl-imino)methyl)phenoxy)ruthenium (Ru-4).

In yet another embodiment of this invention, the composition of this invention encompasses a mixture of 2-hexyl-1,2,3,4,4a,5,8,8a-octahydro-1,4:5,8-dimethanonaphthalene (HexylTD), 1-chloro-4-propoxy-9H-thioxanthen-9-one (CPTX), N,N-dimethylpyridin-4-amine (DMAP), (2,5-bis(5-tert-butyl-benzoxazol-2-yl)thiophene (BTBBT) and 1,3-bis(2,4,6-trimethylphenylimidazolidin-2-ylidene)-3-phenyl-1H-inden-1-ylidene)-2-(methylthio)phenoxy-ruthenium-triphenylphosphine chloride (Ru-5).

In a further aspect of this invention there is provided a kit for forming a substantially transparent film. There is dispensed in this kit a composition of this invention. Accordingly, in some embodiments there is provided a kit in which there is dispensed one or more monomers of formula (I), an organo-ruthenium compound of formula (II) or an organo-ruthenium compound of formula (III), a compound of formula (IV) or (V), a compound of formula (VI) and a compound of formula (VII), and optionally one or more monomers of formula (VIII) or one or more monomers of formula (IX) and various other additives as described herein.

Accordingly, in some embodiments of this invention the kit according to this invention contains one or more monomers of formula (I), an organo-ruthenium compound of formula (II), a compound of formula (IV), a compound of formula (VI) and a compound of formula (VII).

In yet some other embodiments the kit according to this invention contains one or more monomers of formula (I), an organo-ruthenium compound of formula (II), a compound of formula (IV), a compound of formula (VI), a compound of formula (VII) and one or more additives as described herein.

In some embodiments, the aforementioned kit encompasses two or more monomers of formula (I) distinct from one another as described hereinabove. In some other embodiments the kit of this invention encompasses at least two monomers wherein first monomer facilitates dissolution of the second monomer and/or the organo-ruthenium compounds of formulae (II) or (III) and the additives as described hereinabove. Any of the monomers of formula (I) as described herein can be used in this embodiment. The molar ratio of first and the second monomer of formula (I) contained in these components can vary and may range from 1:99 to 99:1, or 10:90 to 90:10, 20:80 to 80:20, 30:70 to 70:30, 60:40 to 40:60 or 50:50, and so on. In some other embodiments the kit may encompass a composition wherein dispensed more than two monomers of formula (I), each distinct from one another. Further, as noted the first monomer of formula (I) is completely soluble in the second monomer of formula (I) to form a clear solution at room temperature. In some embodiments the monomer mixture may become a clear solution at slightly elevated temperature, such as for example, 30° C. or 40° C. or 50° C.

In another aspect of this embodiment of this invention the composition of this invention undergoes mass polymerization when subjected to suitable radiation for a sufficient length of time to form a polymeric film or a solid object. That is to say that the composition of this invention is poured onto a surface or onto a substrate which needs to be encapsulated, and exposed to suitable radiation in order for the monomers to undergo polymerization to form a solid transparent polymer which could be in the form of a transparent film or a solid object. Generally, as already noted above, such polymerization can take place when exposed to actinic radiation at wavelengths ranging from about 240 nm to 410 nm. The compositions can also be subjected simultaneously to suitable radiation and heat to cause mass polymerization. By practice of this invention it is now possible to obtain polymeric films on such substrates which are substantially transparent film or solid objects depending on the method of fabrication employed. The "substantially transparent film" as used herein means that the films formed from the composition of this invention are optically clear in the visible light. Accordingly, in some embodiments of this invention such films are having at least 90 percent of visible light transmission, in some other embodiments the films formed from the composition of this invention exhibit at least 95 percent of visible light transmission.

In some embodiments, the kit as described herein encompasses a composition, which contains a mixture of 2-hexyl-1,2,3,4,4a,5,8,8a-octahydro-1,4:5,8-dimethanonaphthalene (HexylTD), 1-chloro-4-propoxy-9H-thioxanthen-9-one (CPTX), N,N-dimethylpyridin-4-amine (DMAP), (2,5-bis(5-tert-butyl-benzoxazol-2-yl)thiophene (BTBBT) and 1,3-bis(2,4,6-trimethylphenylimidazolidin-2-ylidene)-(2-oxobenzylidene)-2-(((2,6-diisopropylphenyl-imino)methyl)phenoxy)ruthenium (Ru-1).

In yet another embodiment of this invention, the kit as described herein encompasses a composition of this invention containing a mixture of 5-phenethylbicyclo[2.2.1]hept-2-ene (PENB), 1-chloro-4-propoxy-9H-thioxanthen-9-one (CPTX), N,N-dimethylpyridin-4-amine (DMAP), (2,5-bis(5-tert-butyl-benzoxazol-2-yl)thiophene (BTBBT) and 1,3-bis(2,4,6-trimethylphenylimidazolidin-2-ylidene)-(2-oxobenzylidene)-2-(((2,6-diisopropylphenyl-imino)methyl)phenoxy)ruthenium (Ru-1).

In yet another embodiment of this invention, the kit as described herein encompasses a composition of this invention containing a mixture of 2-hexyl-1,2,3,4,4a,5,8,8a-octahydro-1,4:5,8-dimethanonaphthalene (HexylTD), 5-phenethylbicyclo[2.2.1]hept-2-ene (PENB), 1-chloro-4-propoxy-9H-thioxanthen-9-one (CPTX), N,N-dimethylpyridin-4-amine (DMAP), (2,5-bis(5-tert-butyl-benzoxazol-2-yl)thiophene (BTBBT) and 1,3-bis(2,4,6-trimethylphenylimidazolidin-2-ylidene)-(2-oxobenzylidene)-2-(((2,6-diisopropylphenyl-imino)methyl)phenoxy)ruthenium (Ru-1).

In yet another embodiment of this invention, the kit as described herein encompasses a composition of this invention containing a mixture of 2-hexyl-1,2,3,4,4a,5,8,8a-octahydro-1,4:5,8-dimethanonaphthalene (HexylTD), 1-chloro-4-propoxy-9H-thioxanthen-9-one (CPTX), N,N-dimethylpyridin-4-amine (DMAP), (2,5-bis(5-tert-butyl-benzoxazol-2-yl)thiophene (BTBBT) and 1,3-bis(2,4,6-trimethylphenylimidazolidin-2-ylidene)-(2-oxobenzylidene)-2-(((2,6-dimethylphenyl-imino)methyl)phenoxy)ruthenium (Ru-2).

In yet another embodiment of this invention, the kit as described herein encompasses a composition of this invention containing a mixture of 2-hexyl-1,2,3,4,4a,5,8,8a-octahydro-1,4:5,8-dimethanonaphthalene (HexylTD), 1-chloro-4-propoxy-9H-thioxanthen-9-one (CPTX), N,N-dimethylpyridin-4-amine (DMAP), (2,5-bis(5-tert-butyl-benzoxazol-2-yl)thiophene (BTBBT) and 1,3-bis(2,4,6-trimethylphenylimidazolidin-2-ylidene)-(2-oxobenzylidene)-2-(((2,6-diethylphenyl-imino)methyl)phenoxy)ruthenium (Ru-3).

In yet another embodiment of this invention, the kit as described herein encompasses a composition of this invention containing a mixture of 2-hexyl-1,2,3,4,4a,5,8,8a-octahydro-1,4:5,8-dimethanonaphthalene (HexylTD), 1-chloro-4-propoxy-9H-thioxanthen-9-one (CPTX), N,N-dimethylpyridin-4-amine (DMAP), (2,5-bis(5-tert-butyl-benzoxazol-2-yl)thiophene (BTBBT) and 1,3-bis(2,6-diisopropylphenylimidazolidin-2-ylidene)-(2-oxobenzylidene)-2-(((2,6-diisopropylphenyl-imino)methyl)phenoxy)ruthenium (Ru-4).

In yet another embodiment of this invention, the kit as described herein encompasses a composition of this invention containing a mixture of 2-hexyl-1,2,3,4,4a,5,8,8a-octahydro-1,4:5,8-dimethanonaphthalene (HexylTD), 1-chloro-4-propoxy-9H-thioxanthen-9-one (CPTX), N,N-dimethylpyridin-4-amine (DMAP), (2,5-bis(5-tert-butyl-benzoxazol-2-yl)thiophene (BTBBT) and 1,3-bis(2,4,6-trimethylphenylimidazolidin-2-ylidene)-3-phenyl-1H-inden-1-ylidene)-2-(methylthio)phenoxy-ruthenium-triphenylphosphine chloride (Ru-5).

In yet another aspect of this invention there is further provided a method of forming a substantially transparent film for the fabrication of a variety of optoelectronic device comprising:

forming a homogeneous clear composition comprising one or more monomers of formula (I), an organo-ruthenium compound of formula (II) or an organo-ruthenium compound of formula (III), a compound of formula (IV) or (V), a compound of formula (VI), a compound of formula (VII), and optionally one or more monomers of formula (VIII) or (IX) and one or more additives as described herein.

coating a suitable substrate with the composition or pouring the composition onto a suitable substrate to form a film; and either exposing the film to suitable radiation or heating the film to a suitable temperature to cause polymerization of the monomers.

The coating of the desired substrate to form a film with the composition of this invention can be performed by any of the coating procedures as described herein and/or known to one skilled in the art, such as by spin coating. Other suitable coating methods include without any limitation spraying, doctor blading, meniscus coating, ink jet coating and slot coating. The mixture can also be poured onto a substrate to form a film. Suitable substrate includes any appropriate substrate as is, or may be used for electrical, electronic or optoelectronic devices, for example, a semiconductor substrate, a ceramic substrate, a glass substrate.

Next, the coated substrate is exposed to suitable actinic radiation, i.e., exposed to radiation of wavelength ranging from 240 nm to 410 nm as described herein to facilitate the mass polymerization. In some embodiments the substrate is exposed to radiation and baked at a temperature of from about 60° C. to about 90° C. for 2 minutes to 10 minutes. In some other embodiments the substrate is exposed to radiation and baked at a temperature of from about 60° C. to about 90° C. for 5 minutes to 20 minutes.

The films thus formed are then evaluated for their optical properties using any of the methods known in the art. For example, the refractive index of the film across the visible spectrum can be measured by ellipsometry. The optical quality of the film can be determined by visual observation. Quantitatively the percent transparency can be measured by visible spectroscopy. Generally, the films formed according to this invention exhibit excellent optical transparent properties and can be tailored to desirable refractive index as described herein.

Accordingly, in some of the embodiments of this invention there is also provided a optically transparent film obtained by the mass polymerization of the composition as described herein. In another embodiment there is also provided an optoelectronic device comprising the transparent film of this invention as described herein.

As noted, the compositions of this invention can be used in any of the known three dimensional (3D) printing technologies and other printing technologies. A few of the 3D printing procedures known in the art include continuous liquid interface production (CLIP), layer by layer approach (LBL), inkjet printing and frontal polymerization method, such as frontal ring open metathesis (FROMP) technique, see for example Robertson et al., Nature, Vol. 557, 223-227 (2018).

In a CLIP approach, a 3D object is continuously formed by projecting a continuous sequence of UV images (generated by a digital light-processing (DLP) imaging unit or a laser to generate the part) through an oxygen permeable, UV-transparent window below a liquid resin bath containing the compositions of this invention. The dead zone created above the window maintains a liquid interface below the advancing part. Above the dead zone, the curing part is continuously drawn out of the resin bath. The suction forces resulted due to this drawing replenishes the resin bath at the same time. In this way various parts of different dimensions up to several centimeters with part resolution lower than 100 microns can be fabricated.

In a 3D inkjet printing technology, the compositions of this invention can be used as photopolymerizable ink compositions to form lines and vias on a substrate, typically on a silicon wafer. A wide variety of parts having utility in electronic and optoelectronic applications can thus be manufactured using the compositions of this invention. Non limiting examples of such applications include manufacturing of OLED devices on a variety of substrates, which can be produced substantially in a particle free environment at high yields. The compositions of this invention may act as organic encapsulant layers and/or as filler materials in some of such OLED devices.

Accordingly, in yet another aspect of this invention there is further provided a method of forming a three dimensional object comprising:

providing a homogeneous clear composition in a suitable container blanketed with an inert atmosphere, the composition comprising one or more monomers of formula (I), at least one organo-ruthenium compound of formulae (II) or (III), a compound of formula (IV) or a compound of formula (V), a compound of formula (VI), a compound of formula (VII), and optionally one or more monomers of formula (VIII) and/or one or more monomers of formula (IX) in combination with one or more additives as described herein;

exposing to suitable UV radiation while drawing the composition from the container; and forming a three dimensional object.

Surprisingly, it has now been found that providing the composition in a suitable container blanketed with an inert atmosphere it is now possible to form 3D objects which are free of any voids and exhibiting excellent optical, thermal and mechanical properties. Such inert blanketed atmospheres can be achieved by using any of the inert gases which will bring about this effect. Non-limiting examples of such inert gases include nitrogen, helium, argon, and the like. In some embodiments the inert atmosphere used is by way purging with dry nitrogen.

Accordingly, the 3D objects formed in accordance with the method of this invention exhibit excellent optical, thermal and mechanical properties. In general, the properties of these objects can be tailored to intended end use. For example, the thermal properties of the 3D objects can be tailored to be stable up to 180° C. or higher depending upon the types of monomers of formula (I) in combination with monomers of formulae (VIII) or (IX), if employed, to form such 3D objects. Similarly, the mechanical properties can also be tailored to desired mechanical properties simply by the selection of suitable monomers as described herein. In general, by tailoring the proper choice of monomers the parts possessing very high impact strength can be fabricated. Most importantly the compositions of this invention are stable to 3D printing conditions and withstand the temperatures of up to 80° C. without any degradation and/or premature polymerization for several days ranging from about 5 to ten days, thus offering long shelf life stability, among other benefits. In some embodiments the composition of this invention is stable at 80° C. for at least 6 days. In some other embodiments the composition of this invention is stable at 50° C. for at least 10 days. In yet some other embodiments the composition of this invention is stable at 80° C. for at least 8 days.

Accordingly, in some of the embodiments of this invention there is also provided a three dimensional object comprising the composition of this invention which exhibits excellent optical, thermal and mechanical properties.

The following examples are detailed descriptions of methods of preparation and use of certain compounds/monomers, polymers and compositions of the present invention. The detailed preparations fall within the scope of, and serve to exemplify, the more generally described methods of preparation set forth above. The examples are presented for illustrative purposes only, and are not intended as a restriction on the scope of the invention. As used in the examples and throughout the specification the ratio of monomer to catalyst is based on a mole to mole basis.

EXAMPLES

The following abbreviations have been used hereinbefore and hereafter in describing some of the compounds, instruments and/or methods employed to illustrate certain of the embodiments of this invention:
HexylTD—2-hexyl-1,2,3,4,4a,5,8,8a-octahydro-1,4:5,8-dimethanonaphthalene; CPD3—3a,4,4a,5,8,8a,9,9a-octahydro-1H-4,9:5,8-dimethanocyclopenta[b]naphthalene; Ru-1—1,3-bis(2,4,6-trimethylphenylimidazolidin-2-ylidene)-(2-oxobenzylidene)-2-(((2,6-diisopropylphenyl-imino)methyl)phenoxy)ruthenium; CPTX—1-chloro-4-propoxy-9H-thioxanthen-9-one; DMAP—N,N-dimethylpyridin-4-amine; BTBBT—(2,5-bis(5-tert-butyl-benzoxazol-2-yl)thiophene; Irganox 1076—3,5-bis(1,1-dimethylethyl)-4-hydroxy-octadecyl ester benzenepropanoic acid; Irgafos 168—tris(2,4-ditert-butylphenyl)phosphite; phr—parts per hundred parts of monomer; TGA—thermogravimetric analysis.

Various monomers as used herein are either commercially available or can be readily prepared following the procedures as described in the co-pending U.S. Pat. No. 9,944,818.

The following Examples demonstrate that the compositions of this invention are quite stable at 50° C. or at 80° C. for several days and can very readily be mass polymerized by subjecting to UV light and thereby forming 3D objects as specified below.

Example 1

Printing of 3D Objects Under Nitrogen Blanket

In a glass brown bottle, CPTX (0.5 phr), Irganox 1076 (1 phr), Irgafos 168 (0.25 phr), DMAP (0.1 molar part) and BTBBT (0.01 molar part) were dissolved in HexylTD (10,000 molar parts) via sonication at 40° C. for 1 hour to form a clear solution. The solution was purged with nitrogen for 8 hours. Ru-1 catalyst (1 molar part) was added in a glove box to the purged solution and sonicated for 30 minutes to completely dissolve the catalyst. Flashforge Hunter DLP 3D printer was used to print various 3D parts, which was modified such that the space above the composition kept in the vat was blanketed with nitrogen.

FIG. 1 shows a photograph of a clear vertical bar, which can be printed continuously with the above modification to the 3D printer.

Figure 2:
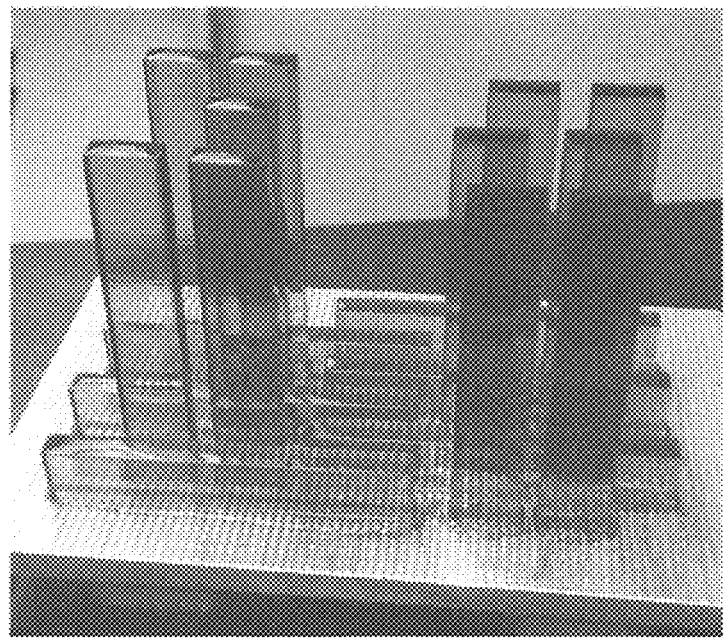
FIG. 2 shows several three dimensional vertical bars printed using a Flashforge Hunter DLP 3D printer using various composition embodiments and a process embodiment of this invention.

FIG. 2 shows various such vertical bars printed from the composition of Example 1.

Figure 3:
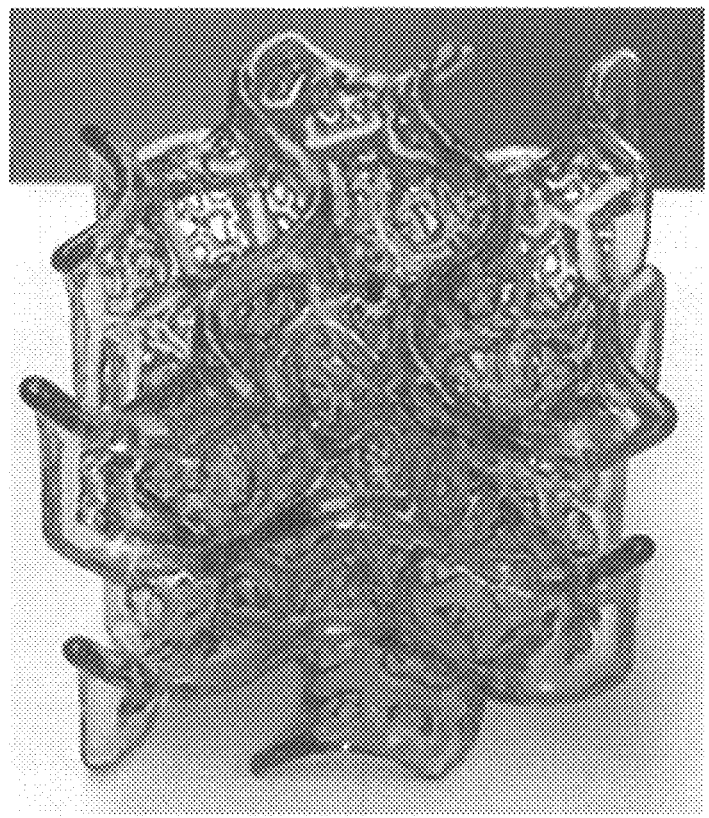
FIG. 3 shows a three dimensional complex object printed using a Flashforge Hunter DLP 3D printer using a composition embodiment and a process embodiment of this invention.
Figure 4:
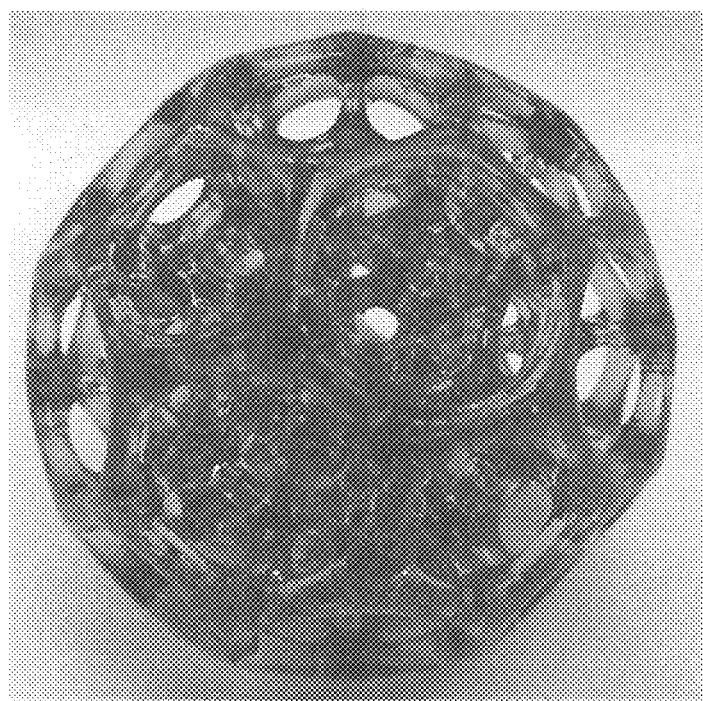
FIG. 4 shows another three dimensional complex object printed using a Flashforge Hunter DLP 3D printer using a composition embodiment and a process embodiment of this invention.

FIGS. 3 and 4 show photographs of various complex objects that can be printed from the composition of Example 1.

Example 2

In a glass bottle, Ru-1 (1 molar part), CPTX (8 molar parts), Irganox 1076 (1 phr), Irgafos 168 (0.25 phr) and BTBBT (0.7 molar parts) were dissolved in HexylTD (9,000 molar parts) and CPD3 (1,000 molar parts) to form a clear solution. The solution was purged with nitrogen for 8 hours. UV DSC (measures at 30° C. after 4 sec of 400 nm UV light exposure) was used to monitor the heat of reaction at different exposure intensities and the results are summarized in Table 1. This composition was also used in Hunter Flashforge 3D DLP printer. The viscosity of the composition remained same even after 12 hours of continuous printing with one hundred percent light intensity and 25 seconds exposure time per layer.

TABLE 1

|  | 120 mW/cm² | 250 mW/cm² | 750 mW/cm² |
|---|---|---|---|
| Heat of Reaction | 142 J/g | 314 J/g | 445 J/g |

Examples 3-5

In a glass brown bottle, CPTX (0.25 phr), Irganox 1076 (1 phr), Irgafos 168 (0.25 phr), DMAP (0.2 molar part), and BTBBT (0.01 phr) were dissolved in HexylTD (10,000 molar parts) via sonication at 40° C. for 1 hour to form a clear solution for the composition of Example 3. n-Butyl acrylate was additionally added to this composition in appropriate quantities as listed in Table 2 for Examples 4 and 5. The solutions so formed in each of Examples 3 to 5 were purged with nitrogen for 8 hours. Ru-1 catalyst (1 molar part) was added in a glove box to each of the purged solution and sonicated for 30 minutes to completely dissolve the catalyst. Flashforge Hunter DLP 3D printer was used to conduct one-time exposure of an image for 300 sec at 8 mW/cm² intensity. The images formed in each of Examples 3 to 5 consisted of lines and spacings of various width. The composition kept in the vat of the printer was blanketed with nitrogen.

TABLE 2

| Example No. | Butyl acrylate (molar parts) |
|---|---|
| Example 3 | 0 |
| Example 4 | 1 |
| Example 5 | 10 |

Figure 7:
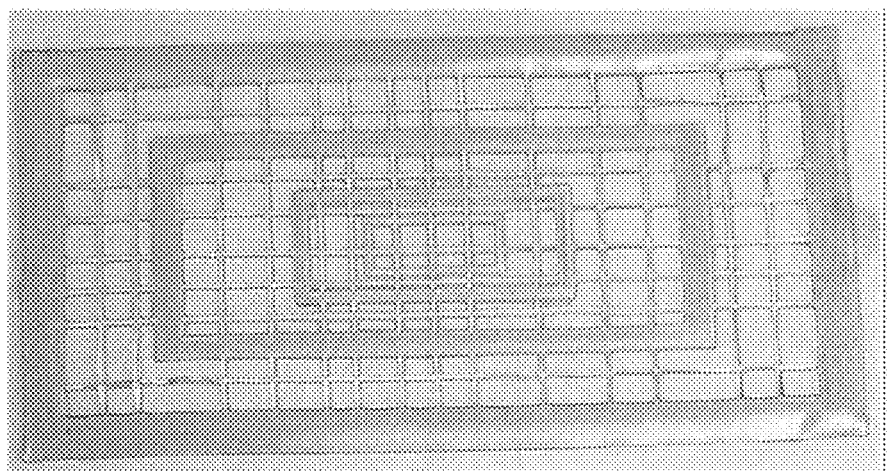
FIGS. 5 to 7 show photographs of the fabricated objects formed from various compositions of this invention.
Figure 6:
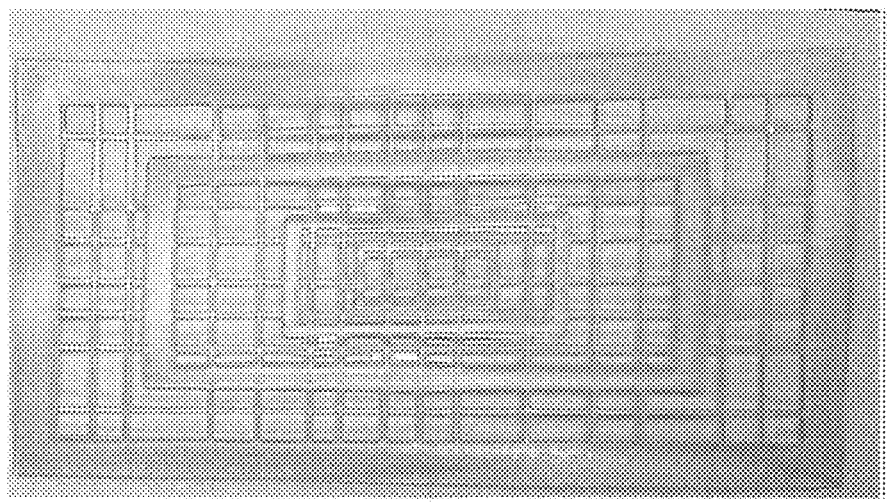
Figure 5:
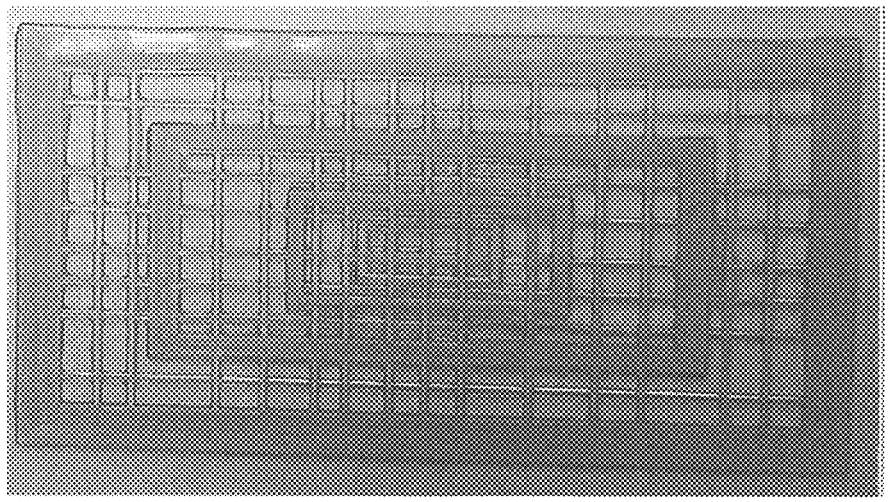

FIGS. 5 to 7 show photographs of the fabricated objects using the composition of Examples 3 to 5, respectively. It is quite apparent that the photographs of the objects formed from the compositions of Examples 4 and 5 featured more clear lines, i.e., FIG. 6 and FIG. 7, respectively. This may perhaps be due to the fact that n-butyl acrylate affectively minimized the dark reaction by trapping chloride radicals that were generated outside of the exposed area due to light scattering.

Comparative Example 1

Printing of 3D Objects without Nitrogen Blanket

Figure 8:
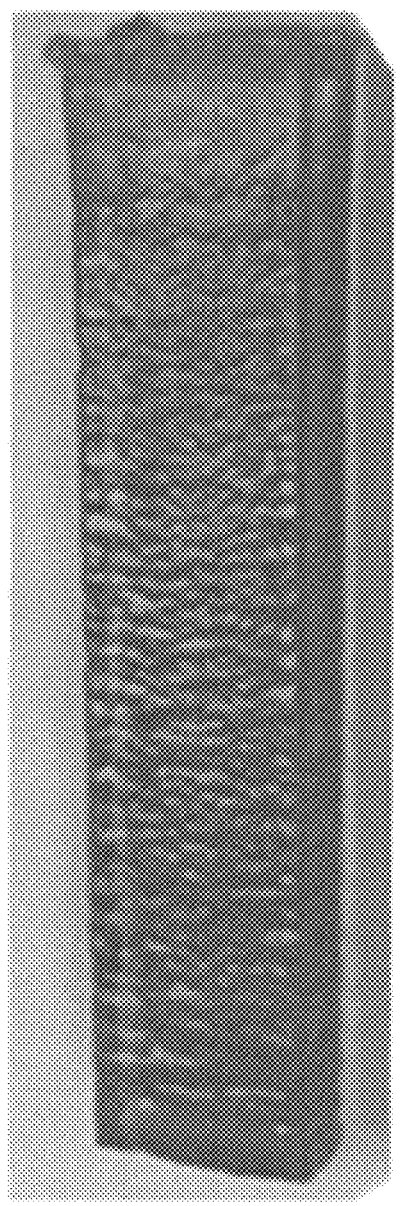
FIG. 8 shows a three dimensional vertical bar printed using a Flashforge Hunter DLP 3D printer, which was printed under ambient atmosphere conditions without a nitrogen blanket.

The procedures of Example 1 were substantially repeated in this Comparative Example 1 except that no nitrogen blanket was used. FIG. 8 shows a vertical bar made under these conditions. It is evident from this photograph that a significant non-uniformity of the printed parts was observed perhaps due to the presence of oxygen in the atmosphere. Also, it is evident that high oxygen level in the composition may have inhibited the initiation of the polymerization reaction, and creating voids in the vertical bar. Attempts to print parts continuously from the same vat did not result in forming any parts.

Comparative Examples 2-4

The procedures of Example 2 were substantially repeated in these Comparative Examples 2-4 except that no BTBBT was used in Comparative Example 2, no BTBBT, Irganox 1076 and Irgafos 168 were used in Comparative Example 3 and no Irganox 1076 and Irgafos 168 were used in Comparative Example 4. UV DSC (measured at 30° C. after 4 sec of 400 nm UV light exposure) was used to monitor the heat of reaction at different exposure intensities and the results are summarized in Table 3.

TABLE 3

|  | 120 mW/cm² | 250 mW/cm² | 750 mW/cm² | 3D printing |
|---|---|---|---|---|
| Comp. Ex. 2 | 222 J/g | 326 J/g | 447 J/g | no gelation |
| Comp. Ex. 3 | 311 J/g | 333 J/g | 443 J/g | gelled |
| Comp. Ex. 4 | 294 J/g | 375 J/g | 450 J/g | partially gelled |

It is evident from the results presented in Table 3 that the composition of this invention exhibits surprisingly superior properties when processed in accordance with the process of this invention. That is, a composition containing the UV blocker in accordance with the composition of this invention exhibits superior properties only when processed properly under nitrogen atmosphere.

Although the invention has been illustrated by certain of the preceding examples, it is not to be construed as being limited thereby; but rather, the invention encompasses the generic area as hereinbefore disclosed. Various modifications and embodiments can be made without departing from the spirit and scope thereof.

What is claimed is:

1. A composition comprising:
a) one or more monomers of formula (I):

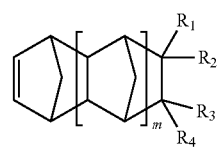

(I)

wherein:
m is an integer 0, 1 or 2;
$R_1$, $R_2$, $R_3$ and $R_4$ are the same or different and each independently selected from the group consisting of hydrogen, halogen, methyl, ethyl, linear or branched ($C_3$-$C_{16}$)alkyl, perfluoro($C_1$-$C_{12}$)alkyl, hydroxy($C_1$-$C_{16}$)alkyl, ($C_3$-$C_{12}$)cycloalkyl, ($C_6$-$C_{12}$)bicycloalkyl, ($C_7$-$C_{14}$)tricycloalkyl, ($C_6$-$C_{10}$)aryl, ($C_6$-$C_{10}$)aryl($C_1$-$C_6$)alkyl, perfluoro($C_6$-$C_{10}$)aryl, perfluoro($C_6$-$C_{10}$)aryl($C_1$-$C_6$)alkyl, tri($C_1$-$C_6$)alkoxysilyl and a group of formula (A):

—Z-Aryl (A)

wherein:
Z is a bond or a group selected from the group consisting of:

$(CR_5R_6)_a$, $O(CR_5R_6)_a$, $(CR_5R_6)_aO$, $(CR_5R_6)_a$—O—$(CR_5R_6)_b$, $(CR_5R_6)_a$—O—$(SiR_5R_6)_b$, $(CR_5R_6)_a$—(CO)O—$(CR_5R_6)_b$, $(CR_5R_6)_a$—O(CO)—$(CR_5R_6)_b$, $(CR_5R_6)_a$—(CO)—$(CR_5R_6)_b$, where a and b are integers which may be the same or different and each independently is 1 to 12;

$R_5$ and $R_6$ are the same or different and each independently selected from the group consisting of hydrogen, methyl, ethyl, linear or branched $(C_3\text{-}C_6)$alkyl, hydroxy, methoxy, ethoxy, linear or branched $(C_3\text{-}C_6)$alkyloxy, acetoxy, $(C_2\text{-}C_6)$acyl, hydroxymethyl, hydroxyethyl, linear or branched hydroxy$(C_3\text{-}C_6)$alkyl, phenyl and phenoxy;

Aryl is phenyl or phenyl substituted with one or more of groups selected from the group consisting of methyl, ethyl, linear or branched $(C_3\text{-}C_6)$alkyl, hydroxy, methoxy, ethoxy, linear or branched $(C_3\text{-}C_6)$alkyloxy, acetoxy, $(C_2\text{-}C_6)$acyl, hydroxymethyl, hydroxyethyl, linear or branched hydroxy$(C_3\text{-}C_6)$alkyl, phenyl and phenoxy;

b) an organo-ruthenium compound selected from the group consisting of a compound of formula (II) and a compound of formula (III):

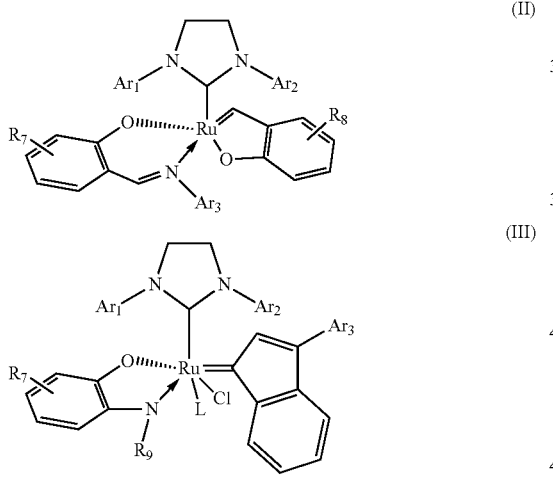

wherein

L is $P(R)_3$, wherein each R is independently selected from the group consisting of methyl, ethyl, linear or branched $(C_3\text{-}C_6)$alkyl, $(C_3\text{-}C_8)$cycloalkyl and $(C_6\text{-}C_{10})$aryl;

$R_7$ and $R_8$ are the same or different and each independently selected from the group consisting of methyl, ethyl, linear or branched $(C_3\text{-}C_6)$alkyl, methoxy, ethoxy and linear or branched $(C_3\text{-}C_6)$alkyloxy;

$R_9$ is selected from the group consisting of methyl, ethyl, linear or branched $(C_3\text{-}C_6)$alkyl, $(C_6\text{-}C_{10})$aryl and $(C_6\text{-}C_{10})$aryl$(C_1\text{-}C_6)$alkyl;

$Ar_1$, $Ar_2$ and $Ar_3$ are the same or different and each independently selected from the group consisting of substituted or unsubstituted phenyl, substituted or unsubstituted biphenyl and substituted or unsubstituted naphthyl, wherein each of said substituents are independently selected from the group consisting of methyl, ethyl and linear or branched $(C_3\text{-}C_6)$alkyl;

c) a compound of formula (IV) or a compound of formula (V):

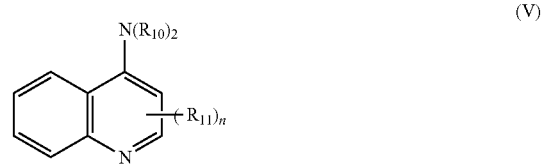

wherein n is an integer from 0 to 4;

each $R_{10}$ is independently selected from the group consisting of hydrogen, methyl, ethyl, n-propyl, iso-propyl, n-butyl, iso-butyl and tert-butyl;

$R_{11}$ is selected from the group consisting of methyl, ethyl, linear or branched $(C_3\text{-}C_6)$alkyl, $(C_6\text{-}C_{10})$aryl, methoxy, ethoxy, linear or branched $(C_3\text{-}C_6)$alkoxy, $(C_6\text{-}C_{10})$aryloxy and halogen;

d) a photoactive compound of formula (VI):

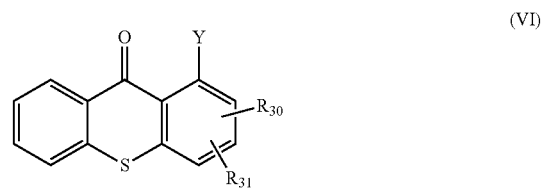

wherein

Y is halogen; and $R_{30}$ and $R_{31}$ are the same or different and independently of each other selected from the group consisting of hydrogen, methyl, ethyl, linear or branched $(C_3\text{-}C_{12})$alkyl, $(C_3\text{-}C_{12})$cycloalkyl, $(C_6\text{-}C_{12})$bicycloalkyl, $(C_7\text{-}C_{14})$tricycloalkyl, $(C_6\text{-}C_{10})$aryl, $(C_6\text{-}C_{10})$aryl$(C_1\text{-}C_3)$alkyl, $(C_1\text{-}C_{12})$alkoxy, $(C_3\text{-}C_{12})$cycloalkoxy, $(C_6\text{-}C_{12})$bicycloalkoxy, $(C_7\text{-}C_{14})$tricycloalkoxy, $(C_6\text{-}C_{10})$aryloxy $(C_1\text{-}C_3)$alkyl and $(C_6\text{-}C_{10})$aryloxy; and e) a compound of formula (VII):

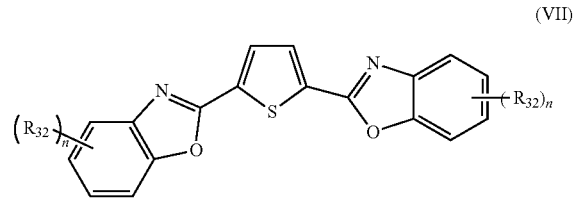

wherein n is an integer from 0 to 4;

each $R_{32}$ is independently selected from the group consisting of hydrogen, methyl, ethyl, linear or branched $(C_3\text{-}C_{12})$alkyl, $(C_3\text{-}C_{12})$cycloalkyl, $(C_6\text{-}C_{12})$bicycloalkyl, $(C_7\text{-}C_{14})$tricycloalkyl, $(C_6\text{-}C_{10})$aryl, $(C_6\text{-}C_{10})$aryl ($C_1$-$C_3$)alkyl, ($C_1$-$C_{12}$)alkoxy, ($C_3$-$C_{12}$)cycloalkoxy, ($C_6$-$C_{12}$)bicycloalkoxy, ($C_7$-$C_{14}$)tricycloalkoxy, ($C_6$-$C_{10}$)aryloxy($C_1$-$C_3$)alkyl and ($C_6$-$C_{10}$)aryloxy; and said composition is in a clear liquid form at room temperature.

2. The composition according to claim 1, wherein said composition comprises first and second monomer of formula (I) distinct from each other and one of said first and second monomers having a refractive index of at least 1.5 and viscosity below 100 centipoise, and wherein said first monomer is completely miscible with said second monomer to form a clear solution.

3. The composition according to claim 1, wherein the monomer of formula (I) is selected from the group consisting of:

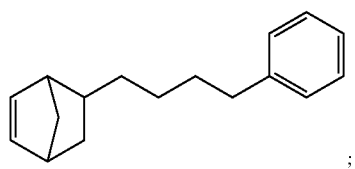

5-(4-phenylbutyl)bicyclo[2.2.1]hept-2-ene

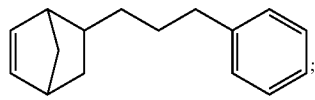

5-(3-phenylpropyl)bicyclo
[2.2.1]hept-
2-ene

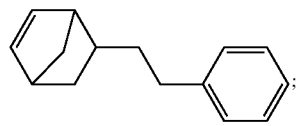

5-phenethylbicyclo[2.2.1]hept-
2-ene (PENB)

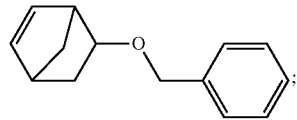

5-(benzyloxy)bicyclo[2.2.1]hept-
2-ene

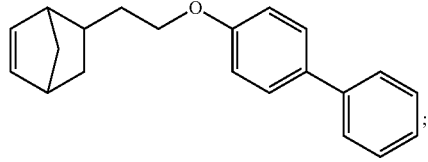

5-(2-([1,1'-biphenyl]-4-
yloxy)ethyl)bicyclo[2.2.1]hept-2-ene

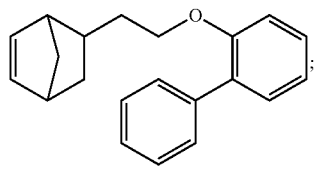

5-(2-([1,1'-biphenyl]-2-
yloxy)ethyl)bicyclo[2.2.1]hept-
2-ene
(NBEtO-2-PhPh)

-continued

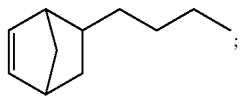

5-butylbicyclo[2.2.1]
hept-2-ene
(BuNB)

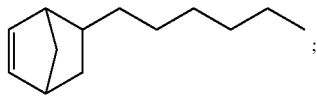

5-hexylbicyclo[2.2.1]hept-2-ene
(HexylNB)

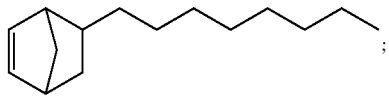

5-octylbicyclo[2.2.1]hept-2-ene (OctNB)

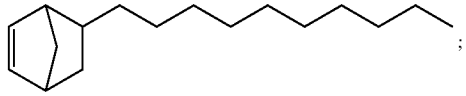

5-decylbicyclo[2.2.1]hept-2-ene (DecNB)

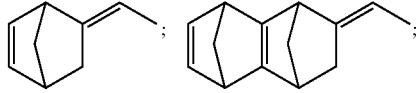

| 5-ethylidenebicyclo[2.2.1]hept-2-ene | 2-ethylidene-1,2,3,4,4a,5,8,8a-octahydro-1,4:5,8-dimethanonaphthanlene |

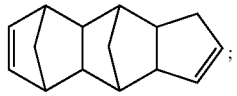

3a,4,4a,5,8,8a,9,9a-
octahydro-
1H-4,9:5,8-
dimethanocyclopenta[b]
naphthalene
(one of trimers of
cyclopentadiene,
TCPD1, also known
as CPD3)

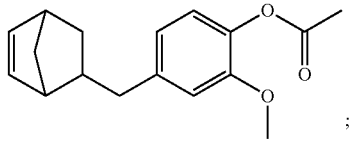

5-norbornenylmethyleugenyl
acetate (EuAcNB)

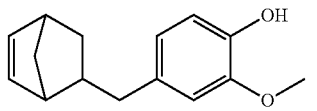

5-norbornenylmethyleugenol
acetate (EuOHNB)

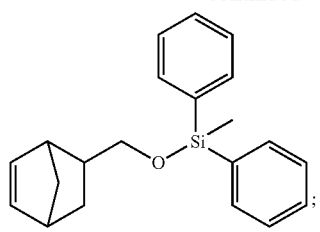

(bicyclo[2.2.1]hept-5-en-2-
ylmethoxy)
(methyl)diphenylsilane
(NBCH₂OSiMePh₂)

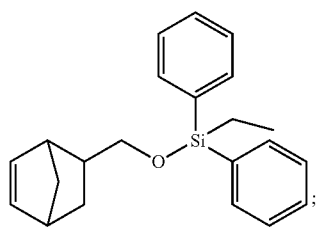

(bicyclo[2.2.1]hept-5-en-2-
ylmethoxy)
(ethyl)diphenylsilane

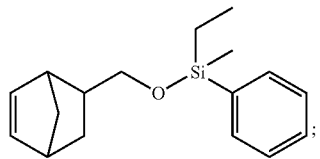

(bicyclo[2.2.1]hept-5-en-2-
ylmethoxy)
(ethyl)(methyl)(phenyl)silane

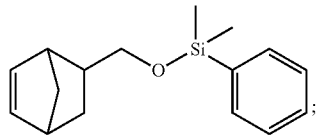

(bicyclo[2.2.1]hept-5-en-2-
ylmethoxy)
dimethyl(phenyl)silane bicyclo[2.2.1]
hept-5-en-2-
yltrimethoxysilane
(TMSNB)

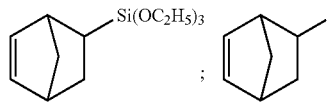

bicyclo[2.2.1]
hept-5-en-2-
yltriethoxysilane
(NBSi(OC₂H₅)₃)

bicyclo[2.2.1]
hept-5-en-2-
yl(tert-butoxy)
dimethoxysilane

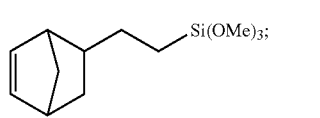

(2-(bicyclo[2.2.1]
hept-5-en-2-
yl)ethyl)trimethoxysilane

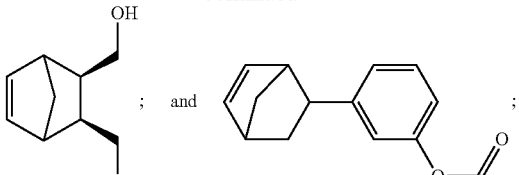

NB(MeOH)₂

PhAcNB

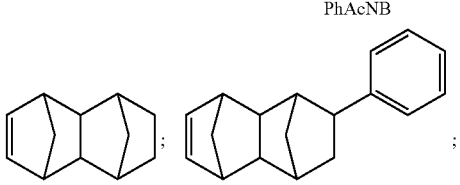

tetracyclododecene
(TD)

2-phenyl-
tetracyclododecene
(PhTD)

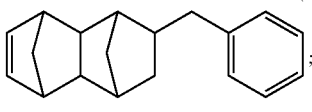

2-benzyl-1,2,3,4,4a,5,8,8a-
octahydro-1,4:5,8-
dimethanonaphthalene

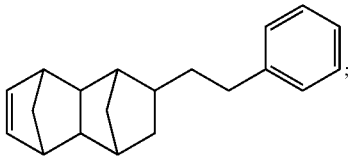

2-phenethyl-1,2,3,4,4a,5,8,8a-
octahydro-1,4:5,8-
dimethanonaphthalene
(PETD)

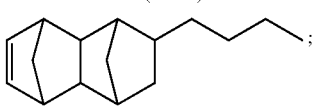

2-butyl-1,2,3,4,4a,5,8,8a-
octahydro-1,4:5,8-
dimethanonaphthalene
(ButylTD)

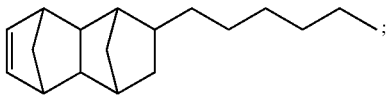

2-hexyl-1,2,3,4,4a,5,8,8a-
octahydro-1,4:5,8-
dimethanonaphthalene
(HexylTD)

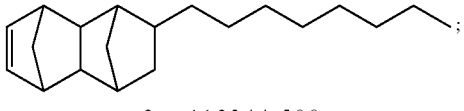

2-octyl-1,2,3,4,4a,5,8,8a-
octahydro-1,4:5,8-
dimethanonaphthalene
(OctylTD)

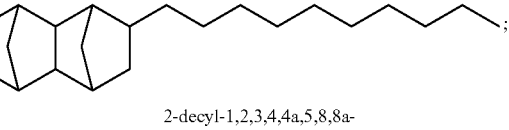

2-decyl-1,2,3,4,4a,5,8,8a-
octahydro-1,4:5,8-
dimethanonaphthalene
(DecylTD)

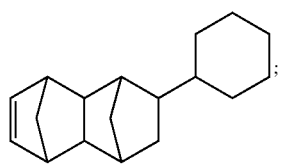

2-cyclohexyl-tetracyclododecene
(CyclohexylTD)

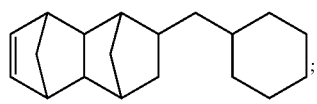

2-cyclohexylmethyl-1,2,3,4,4a,5,8,8a-
octahydro-1,4:5,8-
dimethanonaphthalene

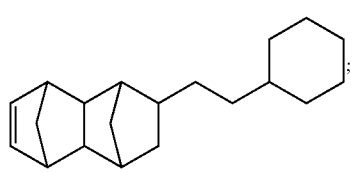

2-cyclohexylethyl-1,2,3,4,4a,5,8,8a-
octahydro-1,4:5,8-
dimethanonaphthalene

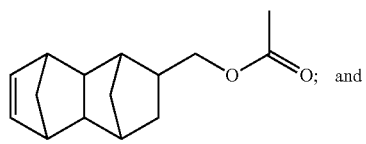

(1,2,3,4,4a,5,8,8a-
octahydro-1,4:5,8-
dimethanonaphthalen-2-yl)methyl
acetate (TDMeOAc)

tetracyclo-
dodecadiene
(TDD)

4. The composition according to claim 1, wherein:

L is selected from the group consisting of P(iPr)$_3$, P(tert-Bu)$_3$, PCy$_3$ and PPh$_3$;

R$_7$ and R$_8$ are the same or different and each independently selected from the group consisting of hydrogen, methyl, ethyl and isopropyl;

R$_9$ is selected from the group consisting of hydrogen, methyl, ethyl and isopropyl;

Ar$_1$, Ar$_2$ and Ar$_3$ are the same or different and each independently selected from the group consisting of phenyl, 2,6-dimethylphenyl, 2,6-diethylphenyl, 2,6-di(isopropyl)phenyl and 2,4,6-trimethylphenyl.

5. The composition according to claim 4, wherein the organo-ruthenium compound of formula (II) or organo-ruthenium compound of formula (III) is selected from the group consisting of:

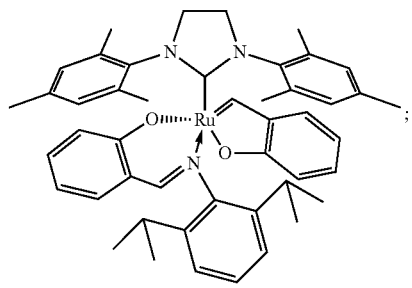

1,3-bis(2,4,6-trimethylphenylimidazolidin-2-
ylidene)-(2-oxobenzylidene)-2-(((2,6-
diisopropylphenyl-
imino)methyl)phenoxy)ruthenium
(Ru-1)

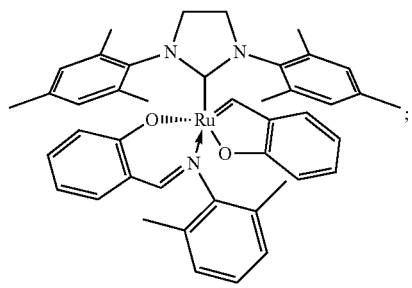

1,3-bis(2,4,6-trimethylphenylimidazolidin-2-
ylidene)-(2-oxobenzylidene)-2-(((2,6-
dimethylphenyl-
imino)methyl)phenoxy)ruthenium
(Ru-2)

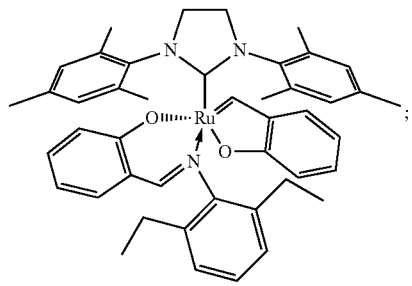

1,3-bis(2,4,6-trimethylphenylimidazolidin-2-
ylidene)-(2-oxobenzylidene)-2-(((2,6-
diethylphenyl-
imino)methyl)phenoxy)ruthenium
(Ru-3)

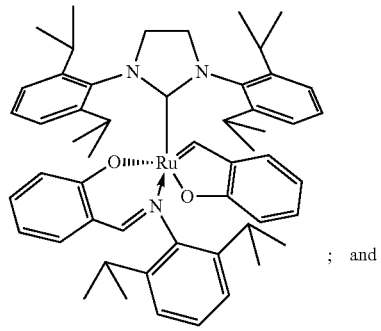

1,3-bis(2,6-
diisotrimethylphenylimidazolidin-2-
ylidene)-(2-oxobenzylidene)-2-(((2,6-
diisopropylphenyl-
imino)methyl)phenoxy)ruthenium
(Ru-4)

-continued

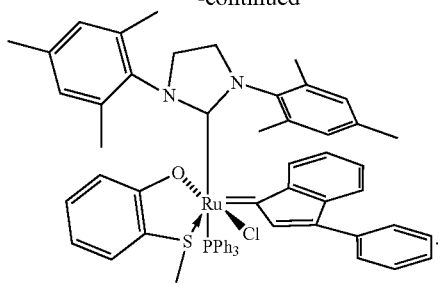

1,3-bis(2,4,6-trimethylphenylimidazolidin-2-ylidene)-3-phenyl-1H-inden-1-ylidene)-2-(methylthio)phenoxy-ruthenium-triphenylphosphine chloride
(Ru-5)

6. The composition according to claim 1, wherein:
n is an integer from 0 to 2;
each $R_{10}$ is independently selected from the group consisting of methyl, ethyl, iso-propyl and tert-butyl; and
$R_{11}$ is selected from the group consisting of methyl, ethyl, iso-propyl, tert-butyl, phenyl, methoxy, ethoxy, phenoxy, fluorine and chlorine.

7. The composition according to claim 1, wherein the compound of formula (IV) is selected from the group consisting of:

N,N-dimethylpyridin-4-amine;
N,N-diethylpyridin-4-amine;
N,N-diisopropylpyridin-4-amine;
N,N-di-tert-butylpyridin-4-amine;
N,N-dimethyl-2-methylpyridin-4-amine;
N,N-di-tert-butyl-2-methylpyridin-4-amine;
2-methoxy-N,N-dimethylpyridin-4-amine;
2-fluoro-N,N-dimethylpyridin-4-amine;
N,N-dimethylquinolin-4-amine;
N,N,2-trimethylquinolin-4-amine;
2-methoxy-N,N-dimethylquinolin-4-amine; and
2-chloro-N,N-dimethylquinolin-4-amine.

8. The composition according to claim 1, wherein the compound of formula (VI) is selected from the group consisting of:

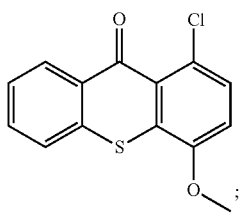

1-chloro-4-methoxy-9H-thioxanthen-9-one

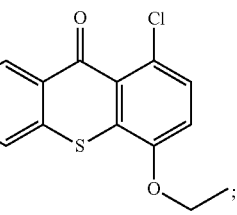

1-chloro-4-ethoxy-9H-thioxanthen-9-one

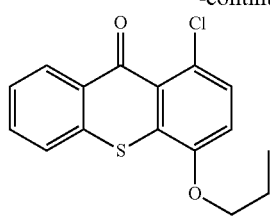

1-chloro-4-propoxy-9H-thioxanthen-9-one (commercially sold under the name CPTX from Lambson)

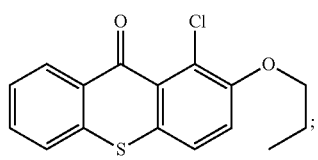

1-chloro-2-propoxy-9H-thioxanthen-9-one

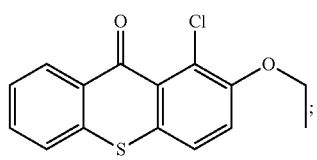

1-chloro-2-ethoxy-9H-thioxanthen-9-one

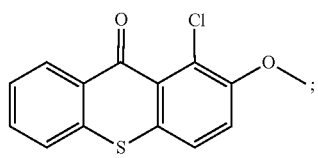

1-chloro-2-methoxy-9H-thioxanthen-9-one

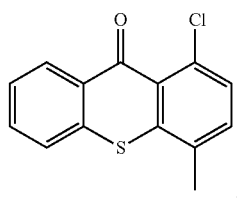

1-chloro-4-methyl-9H-thioxanthen-9-one

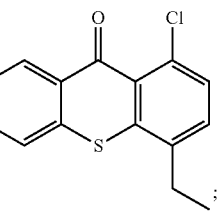

1-chloro-4-ethyl-9H-thioxanthen-9-one

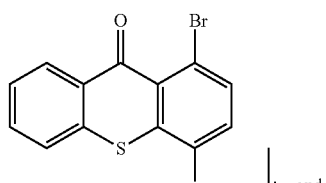

1-bromo-4-propoxy-9H-thioxanthen-9-one

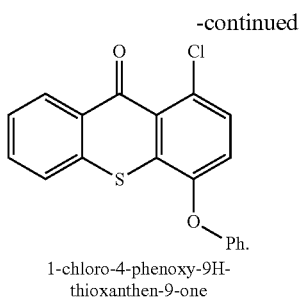

1-chloro-4-phenoxy-9H-
thioxanthen-9-one

9. The composition according to claim 1, wherein the compound of formula (VII) is selected from the group consisting of:

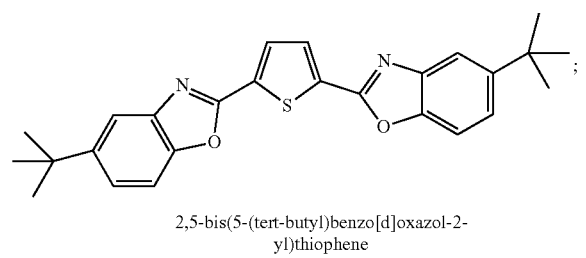

2,5-bis(5-(tert-butyl)benzo[d]oxazol-2-
yl)thiophene

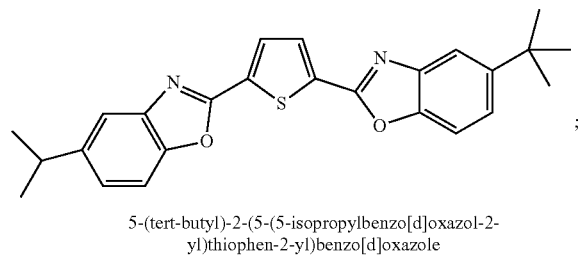

5-(tert-butyl)-2-(5-(5-isopropylbenzo[d]oxazol-2-
yl)thiophen-2-yl)benzo[d]oxazole

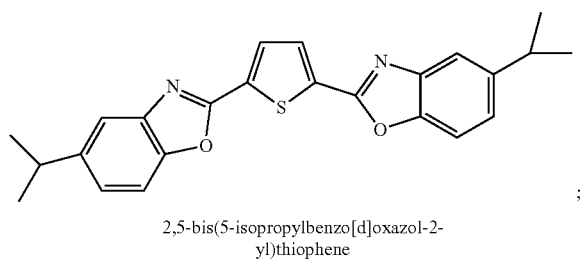

2,5-bis(5-isopropylbenzo[d]oxazol-2-
yl)thiophene

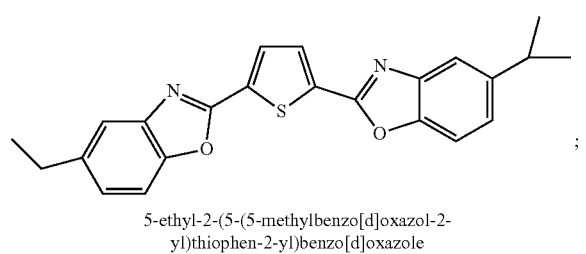

5-ethyl-2-(5-(5-methylbenzo[d]oxazol-2-
yl)thiophen-2-yl)benzo[d]oxazole

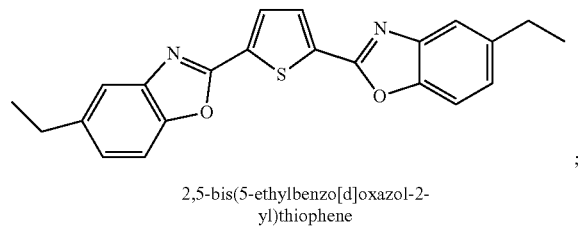

2,5-bis(5-ethylbenzo[d]oxazol-2-
yl)thiophene

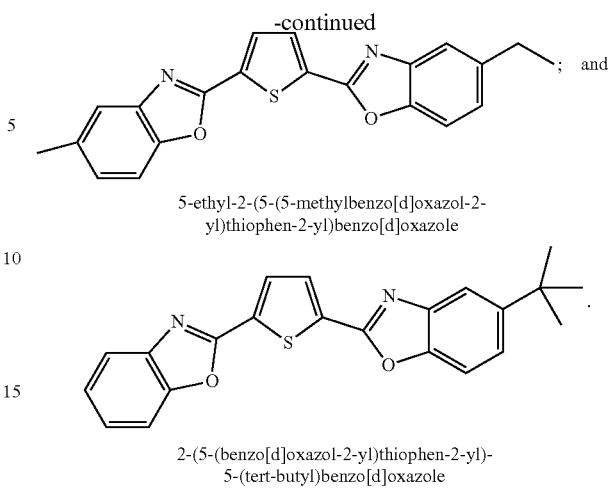

5-ethyl-2-(5-(5-methylbenzo[d]oxazol-2-
yl)thiophen-2-yl)benzo[d]oxazole 2-(5-(benzo[d]oxazol-2-yl)thiophen-2-yl)-
5-(tert-butyl)benzo[d]oxazole 10. The composition according to claim 1, which is selected from the group consisting of:
a mixture of 2-hexyl-1,2,3,4,4a,5,8,8a-octahydro-1,4:5,8-dimethanonaphthalene (HexylTD), 1-chloro-4-propoxy-9H-thioxanthen-9-one (CPTX), N,N-dimethylpyridin-4-amine (DMAP), (2,5-bis(5-tert-butyl-benzoxazol-2-yl)thiophene (BTBBT) and 1,3-bis(2,4,6-trimethylphenylimidazolidin-2-ylidene)-(2-oxobenzylidene)-2-(((2,6-diisopropylphenyl-imino)methyl)phenoxy)ruthenium (Ru-1);
a mixture of 5-phenethylbicyclo[2.2.1]hept-2-ene (PENB), 1-chloro-4-propoxy-9H-thioxanthen-9-one (CPTX), N,N-dimethylpyridin-4-amine (DMAP), (2,5-bis(5-tert-butyl-benzoxazol-2-yl)thiophene (BTBBT) and 1,3-bis(2,4,6-trimethylphenylimidazolidin-2-ylidene)-(2-oxobenzylidene)-2-(((2,6-diisopropylphenyl-imino)methyl)phenoxy)ruthenium (Ru-1);
a mixture of 2-hexyl-1,2,3,4,4a,5,8,8a-octahydro-1,4:5,8-dimethanonaphthalene (HexylTD), 5-phenethylbicyclo[2.2.1]hept-2-ene (PENB), 1-chloro-4-propoxy-9H-thioxanthen-9-one (CPTX), N,N-dimethylpyridin-4-amine (DMAP), (2,5-bis(5-tert-butyl-benzoxazol-2-yl)thiophene (BTBBT) and 1,3-bis(2,4,6-trimethylphenylimidazolidin-2-ylidene)-(2-oxobenzylidene)-2-(((2,6-diisopropylphenyl-imino)methyl)phenoxy)ruthenium (Ru-1);
a mixture of 2-hexyl-1,2,3,4,4a,5,8,8a-octahydro-1,4:5,8-dimethanonaphthalene (HexylTD), 1-chloro-4-propoxy-9H-thioxanthen-9-one (CPTX), N,N-dimethylpyridin-4-amine (DMAP), (2,5-bis(5-tert-butyl-benzoxazol-2-yl)thiophene (BTBBT) and 1,3-bis(2,4,6-trimethylphenylimidazolidin-2-ylidene)-(2-oxobenzylidene)-2-(((2,6-dimethylphenyl-imino)methyl)phenoxy)ruthenium (Ru-2);
a mixture of 2-hexyl-1,2,3,4,4a,5,8,8a-octahydro-1,4:5,8-dimethanonaphthalene (HexylTD), 1-chloro-4-propoxy-9H-thioxanthen-9-one (CPTX), N,N-dimethylpyridin-4-amine (DMAP), (2,5-bis(5-tert-butyl-benzoxazol-2-yl)thiophene (BTBBT) and 1,3-bis(2,4,6-trimethylphenylimidazolidin-2-ylidene)-(2-oxobenzylidene)-2-(((2,6-diethylphenyl-imino)methyl)phenoxy)ruthenium (Ru-3);
a mixture of 2-hexyl-1,2,3,4,4a,5,8,8a-octahydro-1,4:5,8-dimethanonaphthalene (HexylTD), 1-chloro-4-propoxy-9H-thioxanthen-9-one (CPTX), N,N-dimethylpyridin-4-amine (DMAP), (2,5-bis(5-tert-butyl-benzoxazol-2-yl)thiophene (BTBBT) and 1,3-bis(2,6- diisopropylphenylimidazolidin-2-ylidene)-(2-oxobenzylidene)-2-(((2,6-diisopropylphenyl-imino)methyl)phenoxy)ruthenium (Ru-4); and a mixture of 2-hexyl-1,2,3,4,4a,5,8,8a-octahydro-1,4:5,8-dimethanonaphthalene (HexylTD), 1-chloro-4-propoxy-9H-thioxanthen-9-one (CPTX), N,N-dimethylpyridin-4-amine (DMAP), (2,5-bis(5-tert-butyl-benzoxazol-2-yl)thiophene (BTBBT) and 1,3-bis(2,4,6-trimethylphenylimidazolidin-2-ylidene)-3-phenyl-1H-inden-1-ylidene)-2-(methylthio)phenoxy-ruthenium-triphenylphosphine chloride (Ru-5).

11. A kit for forming a substantially transparent film comprising:

a) one or more monomers of formula (I):

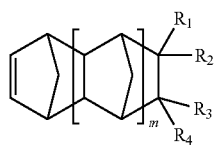

(I)

wherein:

m is an integer 0, 1 or 2;

$R_1$, $R_2$, $R_3$ and $R_4$ are the same or different and each independently selected from the group consisting of hydrogen, halogen, methyl, ethyl, linear or branched ($C_3$-$C_{16}$)alkyl, perfluoro($C_1$-$C_{12}$)alkyl, hydroxy($C_1$-$C_{16}$)alkyl, ($C_3$-$C_{12}$)cycloalkyl, ($C_6$-$C_{12}$)bicycloalkyl, ($C_7$-$C_{14}$)tricycloalkyl, ($C_6$-$C_{10}$)aryl, ($C_6$-$C_{10}$)aryl($C_1$-$C_6$)alkyl, perfluoro($C_6$-$C_{10}$)aryl, perfluoro($C_6$-$C_{10}$)aryl($C_1$-$C_3$)alkyl, tri($C_1$-$C_6$)alkoxysilyl and a group of formula (A):

—Z-Aryl (A)

wherein:

Z is a bond or a group selected from the group consisting of:

$(CR_5R_6)_a$, $O(CR_5R_6)_a$, $(CR_5R_6)_aO$, $(CR_5R_6)_a$—O—$(CR_5R_6)_b$, $(CR_5R_6)_a$—O—$(SiR_5R_6)_b$, $(CR_5R_6)_a$—(CO)O—$(CR_5R_6)_b$, $(CR_5R_6)_a$—O(CO)—$(CR_5R_6)_b$, $(CR_5R_6)_a$—(CO)—$(CR_5R_6)_b$, where a and b are integers which may be the same or different and each independently is 1 to 12;

$R_5$ and $R_6$ are the same or different and each independently selected from the group consisting of hydrogen, methyl, ethyl, linear or branched ($C_3$-$C_6$)alkyl, hydroxy, methoxy, ethoxy, linear or branched ($C_3$-$C_6$)alkyloxy, acetoxy, ($C_2$-$C_6$)acyl, hydroxymethyl, hydroxyethyl, linear or branched hydroxy($C_3$-$C_6$)alkyl, phenyl and phenoxy;

Aryl is phenyl or phenyl substituted with one or more of groups selected from the group consisting of methyl, ethyl, linear or branched ($C_3$-$C_6$)alkyl, hydroxy, methoxy, ethoxy, linear or branched ($C_3$-$C_6$)alkyloxy, acetoxy, ($C_2$-$C_6$)acyl, hydroxymethyl, hydroxyethyl, linear or branched hydroxy($C_3$-$C_6$)alkyl, phenyl and phenoxy;

b) an organo-ruthenium compound selected from the group consisting of a compound of formula (II) and a compound of formula (III):

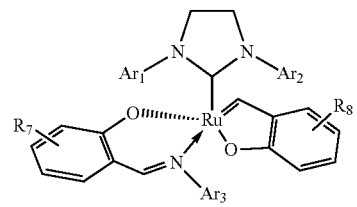

(II)

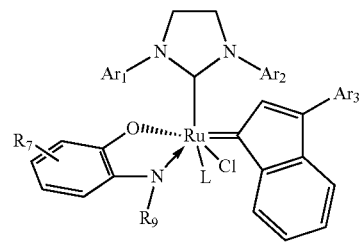

(III)

wherein

L is $PR_3$, wherein each R is independently selected from the group consisting of methyl, ethyl, linear or branched ($C_3$-$C_6$)alkyl, ($C_3$-$C_8$)cycloalkyl and ($C_6$-$C_{10}$)aryl;

$R_7$ and $R_8$ are the same or different and each independently selected from the group consisting of methyl, ethyl, linear or branched ($C_3$-$C_6$)alkyl, methoxy, ethoxy and linear or branched ($C_3$-$C_6$)alkyloxy;

$R_9$ is selected from the group consisting of methyl, ethyl, linear or branched ($C_3$-$C_6$)alkyl, ($C_6$-$C_{10}$)aryl and ($C_6$-$C_{10}$)aryl($C_1$-$C_6$)alkyl;

$Ar_1$, $Ar_2$ and $Ar_3$ are the same or different and each independently selected from the group consisting of substituted or unsubstituted phenyl, substituted or unsubstituted biphenyl and substituted or unsubstituted naphthyl, wherein each of said substituents are independently selected from the group consisting of methyl, ethyl and linear or branched ($C_3$-$C_6$)alkyl; and c) a compound of formula (IV) or a compound of formula (V):

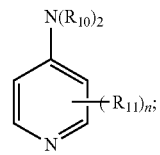

(IV)

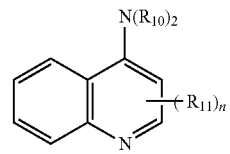

(V)

wherein n is an integer from 0 to 4;

each $R_{10}$ is independently selected from the group consisting of methyl, ethyl, n-propyl, iso-propyl, n-butyl, iso-butyl and tert-butyl;

$R_{11}$ is selected from the group consisting of methyl, ethyl, linear or branched ($C_3$-$C_6$)alkyl, ($C_6$-$C_{10}$)aryl, methoxy, ethoxy, linear or branched ($C_3$-$C_6$)alkoxy, ($C_6$-$C_{10}$)aryloxy and halogen;

d) a photoactive compound of formula (VI):

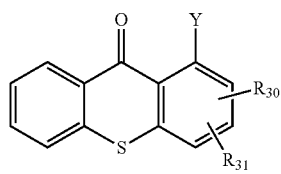

wherein
Y is halogen; and
$R_{30}$ and $R_{31}$ are the same or different and independently of each other selected from the group consisting of hydrogen, methyl, ethyl, linear or branched $(C_3-C_{12})$alkyl, $(C_3-C_{12})$cycloalkyl, $(C_6-C_{12})$bicycloalkyl, $(C_7-C_{14})$tricycloalkyl, $(C_6-C_{10})$aryl, $(C_6-C_{10})$aryl$(C_1-C_3)$alkyl, $(C_1-C_{12})$alkoxy, $(C_3-C_{12})$cycloalkoxy, $(C_6-C_{12})$bicycloalkoxy, $(C_7-C_{14})$tricycloalkoxy, $(C_6-C_{10})$aryloxy $(C_1-C_3)$alkyl and $(C_6-C_{10})$aryloxy; and
e) a compound of formula (VII):

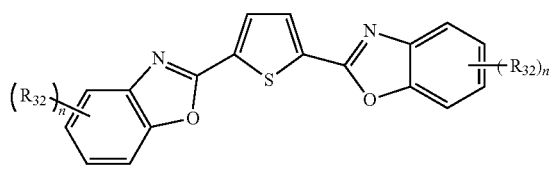

wherein
n is an integer from 0 to 4;
each $R_{32}$ is independently selected from the group consisting of hydrogen, methyl, ethyl, linear or branched $(C_3-C_{12})$alkyl, $(C_3-C_{12})$cycloalkyl, $(C_6-C_{12})$bicycloalkyl, $(C_7-C_{14})$tricycloalkyl, $(C_6-C_{10})$aryl, $(C_6-C_{10})$aryl$(C_1-C_3)$alkyl, $(C_1-C_{12})$alkoxy, $(C_3-C_{12})$cycloalkoxy, $(C_6-C_{12})$bicycloalkoxy, $(C_7-C_{14})$tricycloalkoxy, $(C_6-C_{10})$aryloxy$(C_1-C_3)$alkyl and $(C_6-C_{10})$aryloxy.

12. The kit according to claim 11, wherein the monomer of formula (I) is selected from the group consisting of:

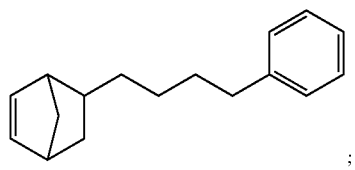

5-(4-phenylbutyl)bicyclo[2.2.1]hept-2-ene

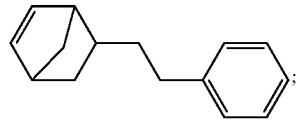

5-phenethylbicyclo[2.2.1]hept-2-ene (PENB)

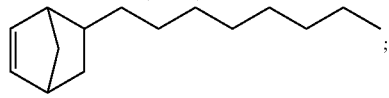

5-octylbicyclo[2.2.1]hept-2-ene (OctNB)

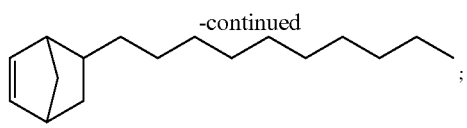

5-decylbicyclo[2.2.1]hept-2-ene (DecNB)

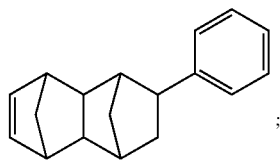

2-phenyl-tetracyclododecene (PhTD)

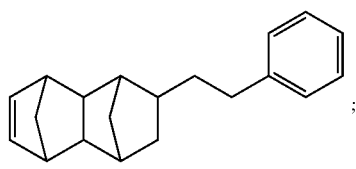

2-phenethyl-1,2,3,4,4a,5,8,8a-octahydro-1,4:5,8-dimethanonaphthalene (PETD)

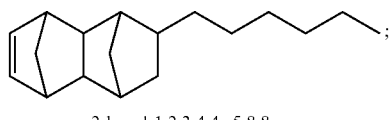

2-hexyl-1,2,3,4,4a,5,8,8a-octahydro-1,4:5,8-dimethanonaphthalene (HexylTD)

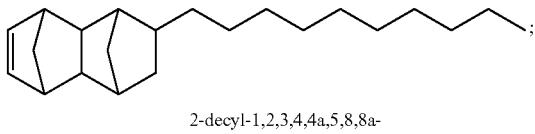

2-decyl-1,2,3,4,4a,5,8,8a-octahydro-1,4:5,8-dimethanonaphthalene (DecylTD)

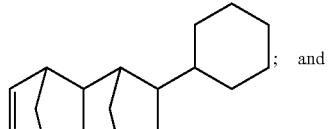

; and 2-cyclohexyl-tetracyclododecene (CyclohexylTD)

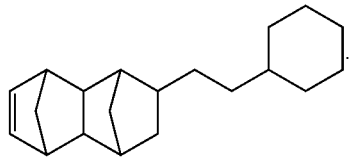

2-cyclohexylethyl-1,2,3,4,4a,5,8,8a-octahydro-1,4:5,8-dimethanonaphthalene

13. The kit according to claim 11, wherein the organo-ruthenium compound of formula (II) or organo-ruthenium compound of formula (III) is selected from the group consisting of:

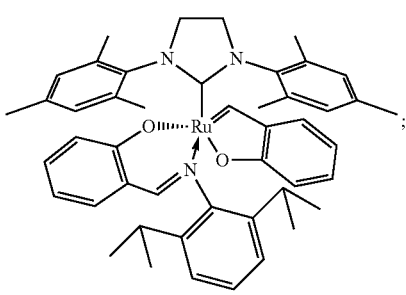

1,3-bis(2,4,6-trimethylphenylimidazolidin-2-
ylidene)-(2-oxobenzylidene)-2-(((2,6-
diisopropylphenyl-
imino)methyl)phenoxy)ruthenium
(Ru-1)

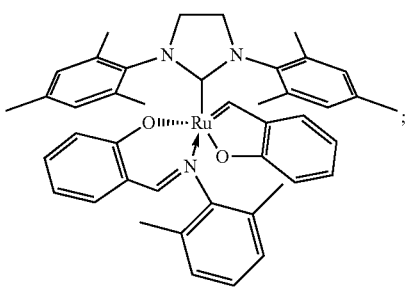

1,3-bis(2,4,6-trimethylphenylimidazolidin-2-
ylidene)-(2-oxobenzylidene)-2-(((2,6-
dimethylphenyl-
imino)methyl)phenoxy)ruthenium
(Ru-2)

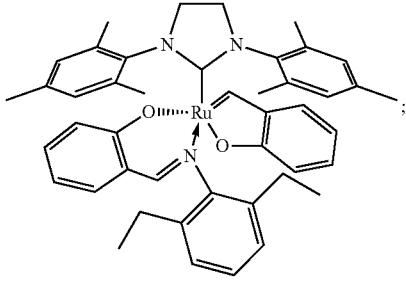

1,3-bis(2,4,6-trimethylphenylimidazolidin-2-
ylidene)-(2-oxobenzylidene)-2-(((2,6-
diethylphenyl-
imino)methyl)phenoxy)ruthenium
(Ru-3)

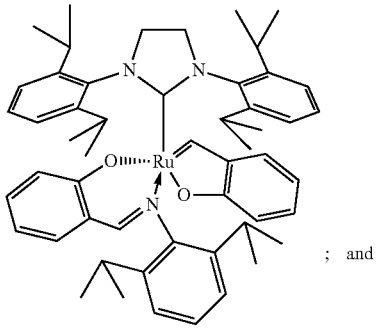

; and 1,3-bis(2,6-
diisotrimethylphenylimidazolidin-2-
ylidene)-(2-oxobenzylidene)-2-(((2,6-
diisopropylphenyl-
imino)methyl)phenoxy)ruthenium
(Ru-4)

-continued

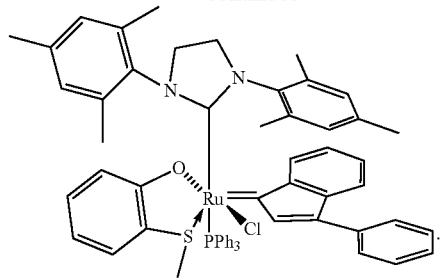

1,3-bis(2,4,6-trimethylphenylimidazolidin-2-
ylidene)-3-phenyl-1H-inden-1-
ylidene)-2-
(methylthio)phenoxy-ruthenium-
triphenylphosphine
chloride
(Ru-5)

14. The kit according to claim 11, wherein the compound of formula (IV) is selected from the group consisting of:

N,N-dimethylpyridin-4-amine;
N,N-diethylpyridin-4-amine;
N,N-diisopropylpyridin-4-amine;
N,N-di-tert-butylpyridin-4-amine;
N,N-dimethyl-2-methylpyridin-4-amine;
N,N-di-tert-butyl-2-methylpyridin-4-amine;
2-methoxy-N,N-dimethylpyridin-4-amine;
2-fluoro-N,N-dimethylpyridin-4-amine;
N,N-dimethylquinolin-4-amine;
N,N,2-trimethylquinolin-4-amine;
2-methoxy-N,N-dimethylquinolin-4-amine; and
2-chloro-N,N-dimethylquinolin-4-amine.

15. The kit according to claim 11, wherein the compound of formula (VI) is selected from the group consisting of:

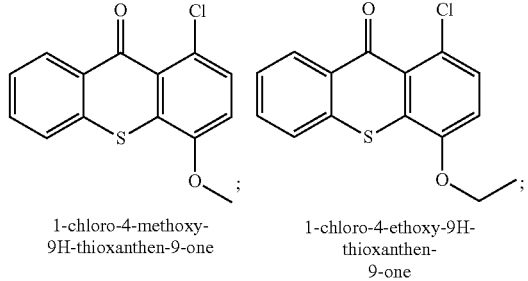

1-chloro-4-methoxy-
9H-thioxanthen-9-one 1-chloro-4-ethoxy-9H-
thioxanthen-
9-one

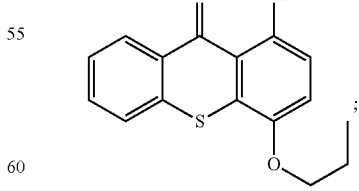

;

1-chloro-4-propoxy-9H-
thioxanthen-
9-one (commercially sold
under
the name CPTX from
Lambson)

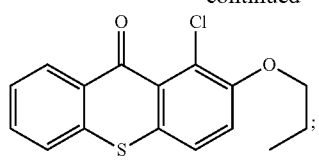

1-chloro-2-propoxy-9H-
thioxanthen-9-one

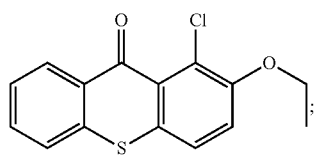

1-chloro-2-ethoxy-9H-
thioxanthen-9-one

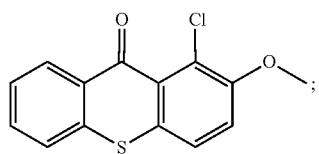

1-chloro-2-methoxy-9H-
thioxanthen-9-one

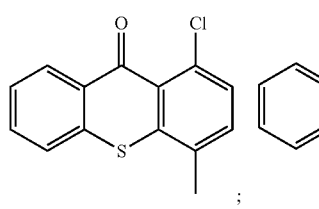

1-chloro-4-methyl-
9H-thioxanthen-9-one 1-chloro-4-ethyl-9H-
thioxanthen-
9-one

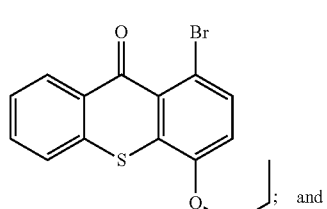

1-bromo-4-propoxy-9H-
thioxanthen-9-one

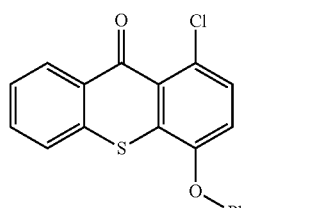

1-chloro-4-phenoxy-9H-
thioxanthen-9-one

16. The kit according to claim 11, wherein the compound of formula (VII) is selected from the group consisting of:

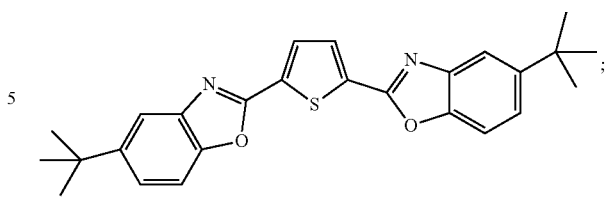

2,5-bis(5-(tert-butyl)benzo[d]oxazol-2-
yl)thiophene

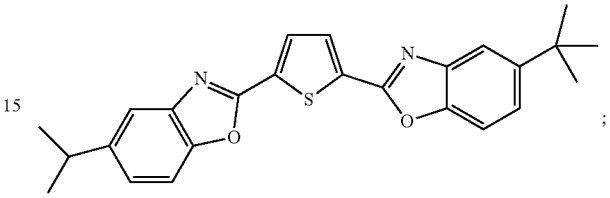

5-(tert-butyl)-2-(5-(5-isopropylbenzo[d]oxazol-2-
yl)thiophen-2-yl)benzo[d]oxazole

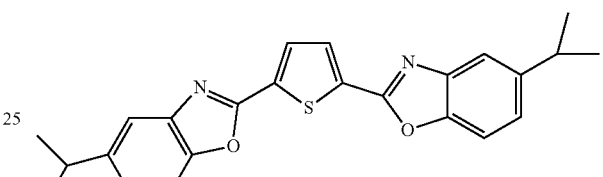

2,5-bis(5-isopropylbenzo[d]oxazol-2-
yl)thiophene

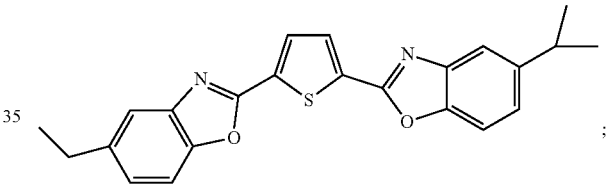

5-ethyl-2-(5-(5-methylbenzo[d]oxazol-2-
yl)thiophen-2-yl)benzo[d]oxazole

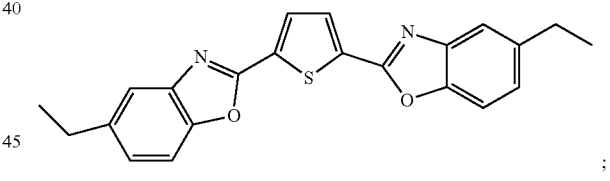

2,5-bis(5-ethylbenzo[d]oxazol-2-
yl)thiophene

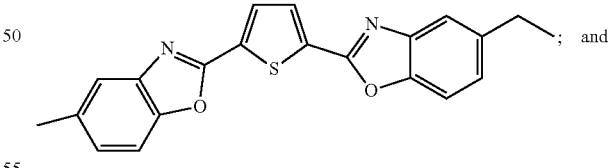

5-ethyl-2-(5-(5-methylbenzo[d]oxazol-2-
yl)thiophen-2-yl)benzo[d]oxazole

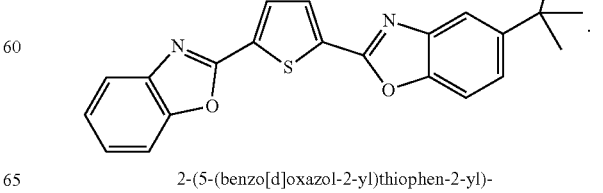

2-(5-(benzo[d]oxazol-2-yl)thiophen-2-yl)-
5-(tert-butyl)benzo[d]oxazole

17. The kit according to claim 11, which contains a mixture selected from the group consisting of:

- a mixture of 2-hexyl-1,2,3,4,4a,5,8,8a-octahydro-1,4:5,8-dimethanonaphthalene (HexylTD), 1-chloro-4-propoxy-9H-thioxanthen-9-one (CPTX), N,N-dimethylpyridin-4-amine (DMAP), (2,5-bis(5-tert-butyl-benzoxazol-2-yl)thiophene (BTBBT) and 1,3-bis(2,4,6-trimethylphenylimidazolidin-2-ylidene)-(2-oxobenzylidene)-2-(((2,6-diisopropylphenyl-imino)methyl)phenoxy)ruthenium (Ru-1);
- a mixture of 5-phenethylbicyclo[2.2.1]hept-2-ene (PENB), 1-chloro-4-propoxy-9H-thioxanthen-9-one (CPTX), N,N-dimethylpyridin-4-amine (DMAP), (2,5-bis(5-tert-butyl-benzoxazol-2-yl)thiophene (BTBBT) and 1,3-bis(2,4,6-trimethylphenylimidazolidin-2-ylidene)-(2-oxobenzylidene)-2-(((2,6-diisopropylphenyl-imino)methyl)phenoxy)ruthenium (Ru-1);
- a mixture of 2-hexyl-1,2,3,4,4a,5,8,8a-octahydro-1,4:5,8-dimethanonaphthalene (HexylTD), 5-phenethylbicyclo[2.2.1]hept-2-ene (PENB), 1-chloro-4-propoxy-9H-thioxanthen-9-one (CPTX), N,N-dimethylpyridin-4-amine (DMAP), (2,5-bis(5-tert-butyl-benzoxazol-2-yl)thiophene (BTBBT) and 1,3-bis(2,4,6-trimethylphenylimidazolidin-2-ylidene)-(2-oxobenzylidene)-2-(((2,6-diisopropylphenyl-imino)methyl)phenoxy)ruthenium (Ru-1);
- a mixture of 2-hexyl-1,2,3,4,4a,5,8,8a-octahydro-1,4:5,8-dimethanonaphthalene (HexylTD), 1-chloro-4-propoxy-9H-thioxanthen-9-one (CPTX), N,N-dimethylpyridin-4-amine (DMAP), (2,5-bis(5-tert-butyl-benzoxazol-2-yl)thiophene (BTBBT) and 1,3-bis(2,4,6-trimethylphenylimidazolidin-2-ylidene)-(2-oxobenzylidene)-2-(((2,6-dimethylphenyl-imino)methyl)phenoxy)ruthenium (Ru-2);
- a mixture of 2-hexyl-1,2,3,4,4a,5,8,8a-octahydro-1,4:5,8-dimethanonaphthalene (HexylTD), 1-chloro-4-propoxy-9H-thioxanthen-9-one (CPTX), N,N-dimethylpyridin-4-amine (DMAP), (2,5-bis(5-tert-butyl-benzoxazol-2-yl)thiophene (BTBBT) and 1,3-bis(2,4,6-trimethylphenylimidazolidin-2-ylidene)-(2-oxobenzylidene)-2-(((2,6-diethylphenyl-imino)methyl)phenoxy)ruthenium (Ru-3);
- a mixture of 2-hexyl-1,2,3,4,4a,5,8,8a-octahydro-1,4:5,8-dimethanonaphthalene (HexylTD), 1-chloro-4-propoxy-9H-thioxanthen-9-one (CPTX), N,N-dimethylpyridin-4-amine (DMAP), (2,5-bis(5-tert-butyl-benzoxazol-2-yl)thiophene (BTBBT) and 1,3-bis(2,6-diisopropylphenylimidazolidin-2-ylidene)-(2-oxobenzylidene)-2-(((2,6-diisopropylphenyl-imino)methyl)phenoxy)ruthenium (Ru-4); and
- a mixture of 2-hexyl-1,2,3,4,4a,5,8,8a-octahydro-1,4:5,8-dimethanonaphthalene (HexylTD), 1-chloro-4-propoxy-9H-thioxanthen-9-one (CPTX), N,N-dimethylpyridin-4-amine (DMAP), (2,5-bis(5-tert-butyl-benzoxazol-2-yl)thiophene (BTBBT) and 1,3-bis(2,4,6-trimethylphenylimidazolidin-2-ylidene)-3-phenyl-1H-inden-1-ylidene)-2-(methylthio)phenoxy-ruthenium-triphenylphosphine chloride (Ru-5).

18. A film comprising the composition of claim 1.

19. A film formed from the kit of claim 11.

20. A process for forming a three dimensional printed article comprising:
- providing a composition according to claim 1 in a container blanketed with an inert atmosphere;
- exposing to suitable UV radiation while drawing the composition from the container; and
- forming the three dimensional article.

* * * * *